United States Patent [19]
Shibaki et al.

[11] Patent Number: 5,764,368
[45] Date of Patent: Jun. 9, 1998

[54] IMAGE PROCESSING APPARATUS USING RETRIEVAL SHEETS CAPABLE OF RECORDING ADDITIONAL RETRIEVAL INFORMATION

[75] Inventors: Masako Shibaki, Kawasaki; Takefumi Nosaki, Odawara; Toshiharu Takahashi, Kawasaki, all of Japan

[73] Assignee: Kabushiki Kaisha Toshiba, Kawasaki, Japan

[21] Appl. No.: 124,399

[22] Filed: Sep. 21, 1993

[30] Foreign Application Priority Data

Sep. 24, 1992 [JP] Japan .................. 4-254516
Sep. 14, 1993 [JP] Japan .................. 5-228620

[51] Int. Cl.⁶ .................. H04N 1/00; H04N 1/40
[52] U.S. Cl. .................. 358/296; 358/403; 358/444
[58] Field of Search .................. 358/296, 400, 358/401, 403, 434, 440, 443, 444; 235/462; 399/82–84

[56] References Cited

U.S. PATENT DOCUMENTS

| | | | |
|---|---|---|---|
| 4,893,333 | 1/1990 | Baran et al. | 358/468 X |
| 4,942,479 | 7/1990 | Kanno | 358/448 |
| 5,153,744 | 10/1992 | Nobuta | 358/403 X |
| 5,168,371 | 12/1992 | Takayanagi | 358/296 |
| 5,282,052 | 1/1994 | Johnson et al. | 358/440 X |
| 5,321,520 | 6/1994 | Inga | 358/403 |
| 5,465,167 | 11/1995 | Cooper et al. | 358/403 X |
| 5,490,217 | 2/1996 | Wang et al. | 235/462 |
| 5,515,175 | 5/1996 | Okada | 358/468 X |

FOREIGN PATENT DOCUMENTS

| | | | |
|---|---|---|---|
| 2-257762 | 10/1990 | Japan | H04N 1/21 |
| 3-196266 | 8/1991 | Japan | G06F 15/401 |

*Primary Examiner*—Eric Frahm
*Attorney, Agent, or Firm*—Foley & Lardner

[57] ABSTRACT

Document information input by a scanner is stored in a disk storage device. Document identification information of plural document information items stored in the disk storage device is printed on a list-format retrieval sheet by a printer. The document identification information of document information newly registered in the disk storage device is printed by the printer on a vacant area of an already output retrieval sheet.

6 Claims, 29 Drawing Sheets

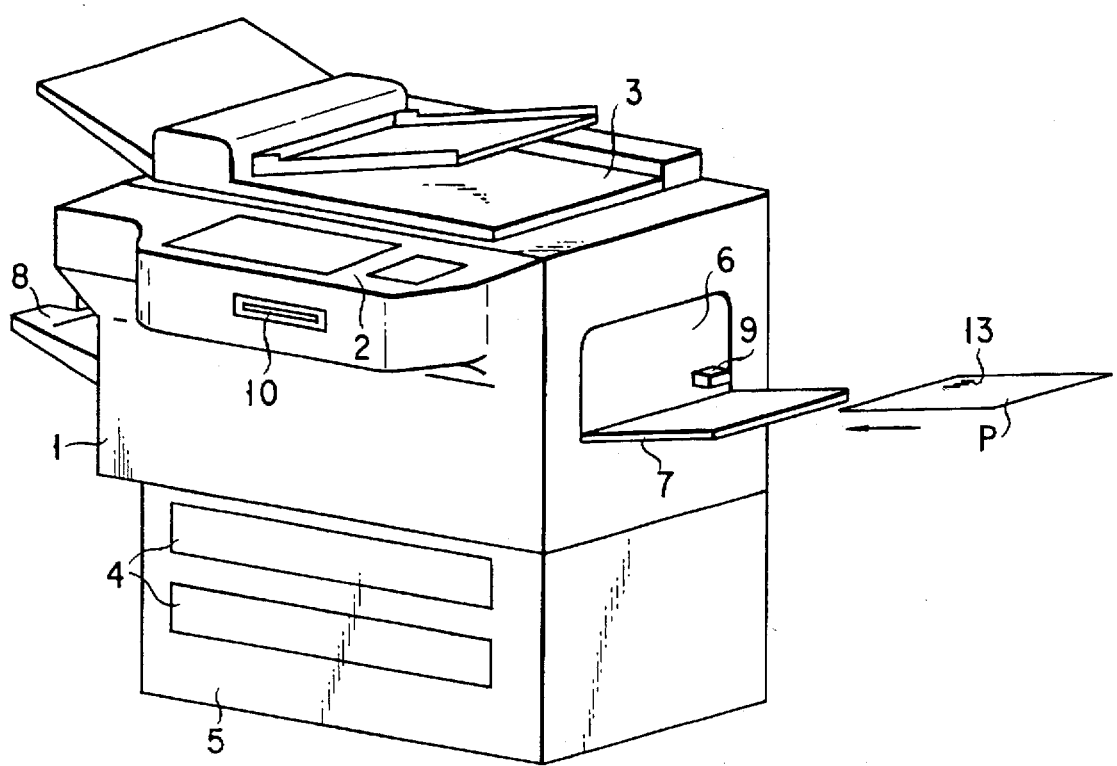
F I G. 1.

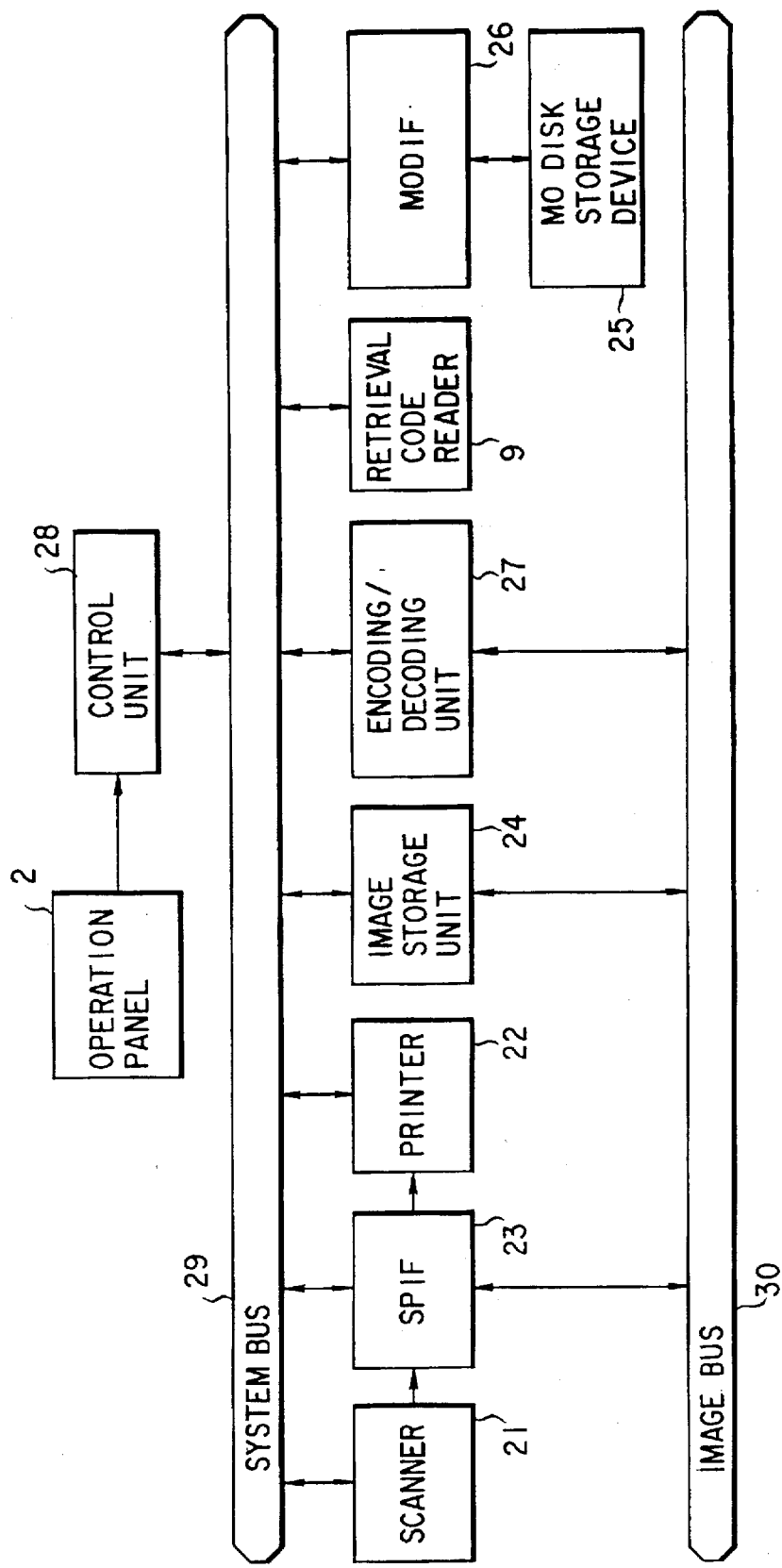
F I G. 2

|  | BINDER NAME ④ |  |  | ||||||||||| |
|---|---|---|---|---|
|  | FILE NAME | DATE/TIME | SIZE | NUMBER OF SHEET |
| 24 | '91 WEEKLY REPORT | 92/2/5 9:30 | A4 | 3 |
| 25 | '91 RECREATION | 92/2/9 16:45 | B4 | 12 |
| 26 | DOCUMENT NAME A | 92/2/23 15:12 | A3 | 2 |
| 27 | DOCUMENT NAME B | 92/2/27 10:14 | A4 | 25 |

| FILE NAME | MODE | CAPACITY (BYTE) | RECORDED DATE/TIME | FILE NO. |
|---|---|---|---|---|
| PRINTER CATALOG | PHOTOGRAPH | 365.540 | 13:14/92/8/10 | 16 |
| FAX CATALOG | PHOTOGRAPH | 412.976 | 13:18/92/8/10 | 17 |
| PRICE LIST | CHARACTER | 62.318 | 13:20/92/8/10 | 18 |
| ACCESSORY LIST | CHARACTER | 26.796 | 13:22/92/8/10 | 19 |

BINDER NAME

FIG. 3C

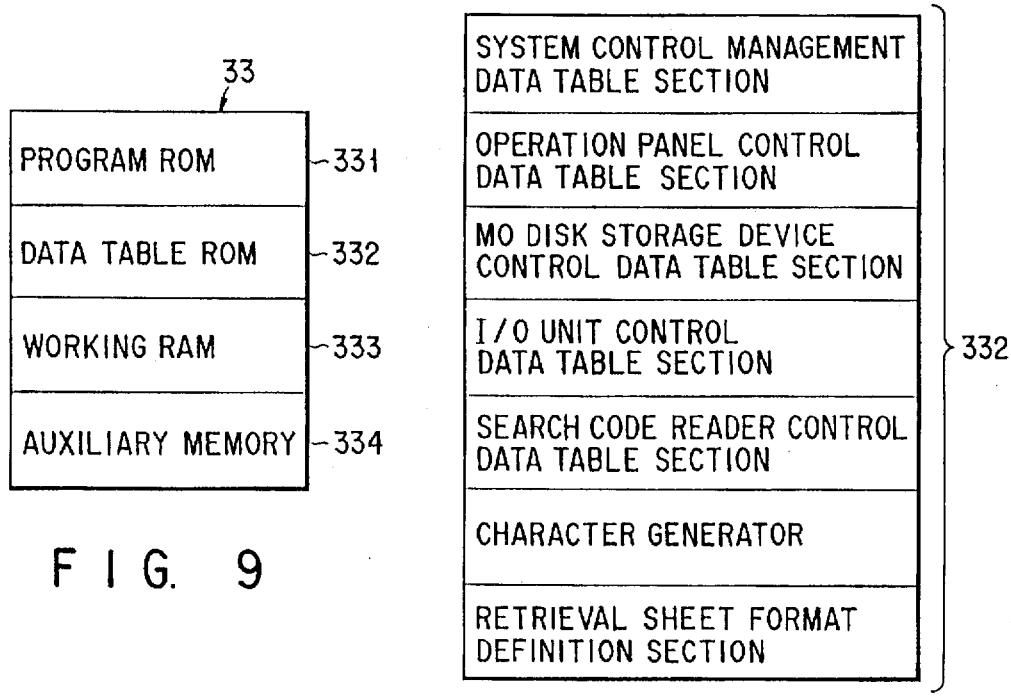
FIG. 9
FIG. 11A
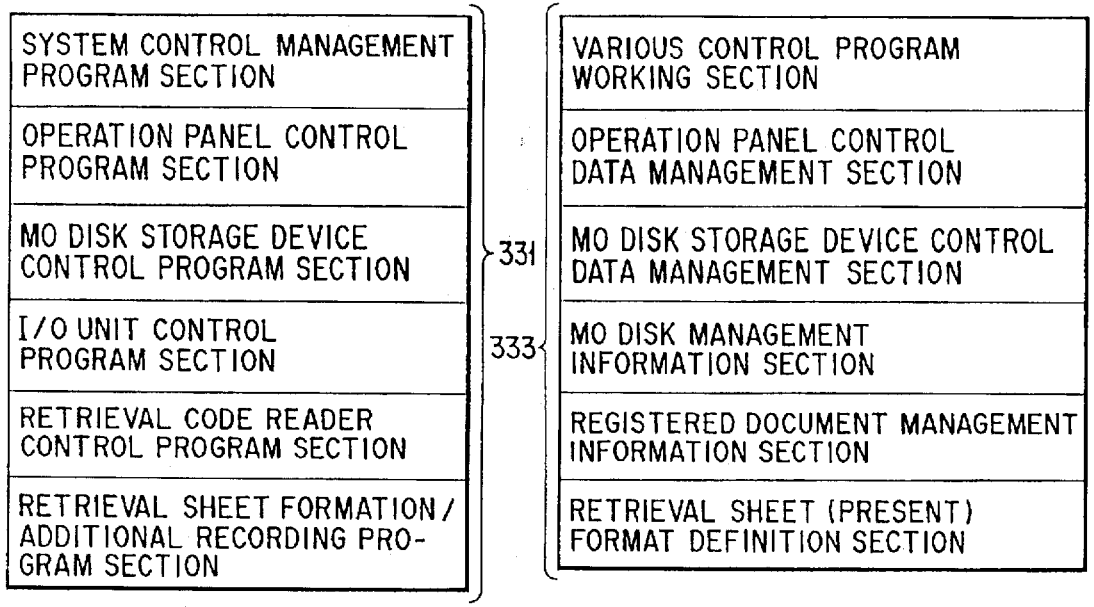
FIG. 10
FIG. 12

| | |
|---|---|
| BINDER 1 NAME ADDRESS | ~615 |
| BINDER 2 NAME ADDRESS | |
| ⋮ | |
| BINDER n NAME ADDRESS | ~616 |
| ⋮ | |
| BINDER 1 MANAGEMENT INFORMATION ADDRESS | |
| BINDER 2 MANAGEMENT INFORMATION ADDRESS | |
| ⋮ | |
| BINDER n MANAGEMENT INFORMATION ADDRESS | |
| ⋮ | |
| BINDER 1 ATTRIBUTE INFORMATION | ~617 |
| BINDER 2 ATTRIBUTE INFORMATION | |
| ⋮ | |
| BINDER n ATTRIBUTE INFORMATION | ~618 |
| ⋮ | |
| BINDER 1 NAME | |
| BINDER 2 NAME | |
| ⋮ | |
| BINDER n NAME | |

F I G. 16

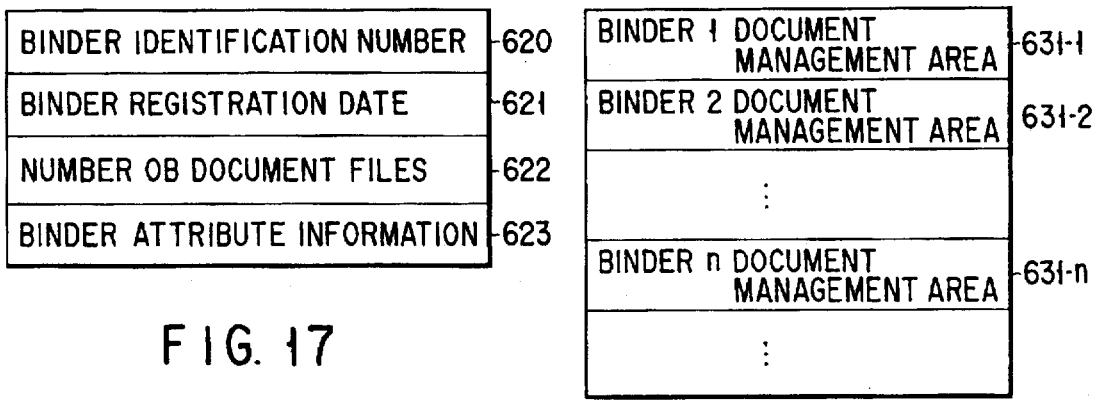
FIG. 17
FIG. 18
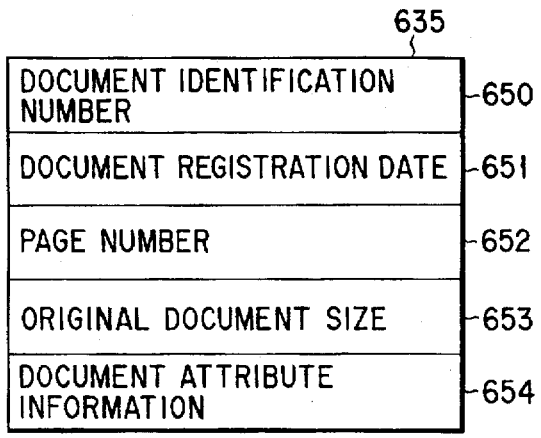
FIG. 21A
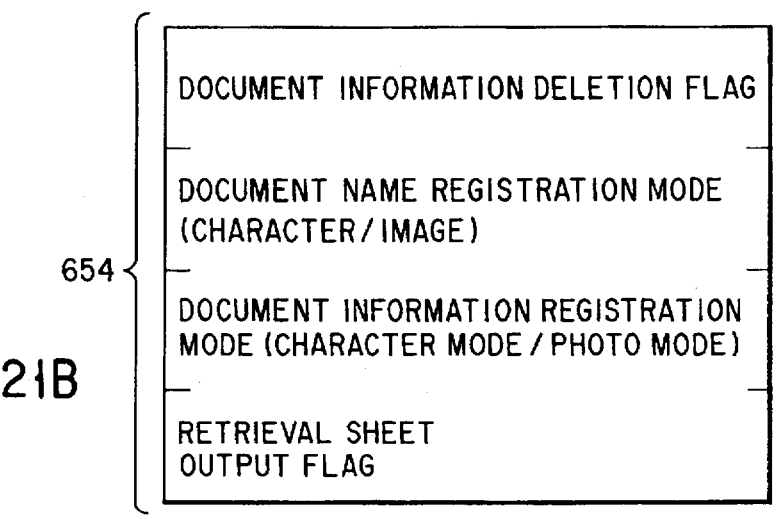
FIG. 21B

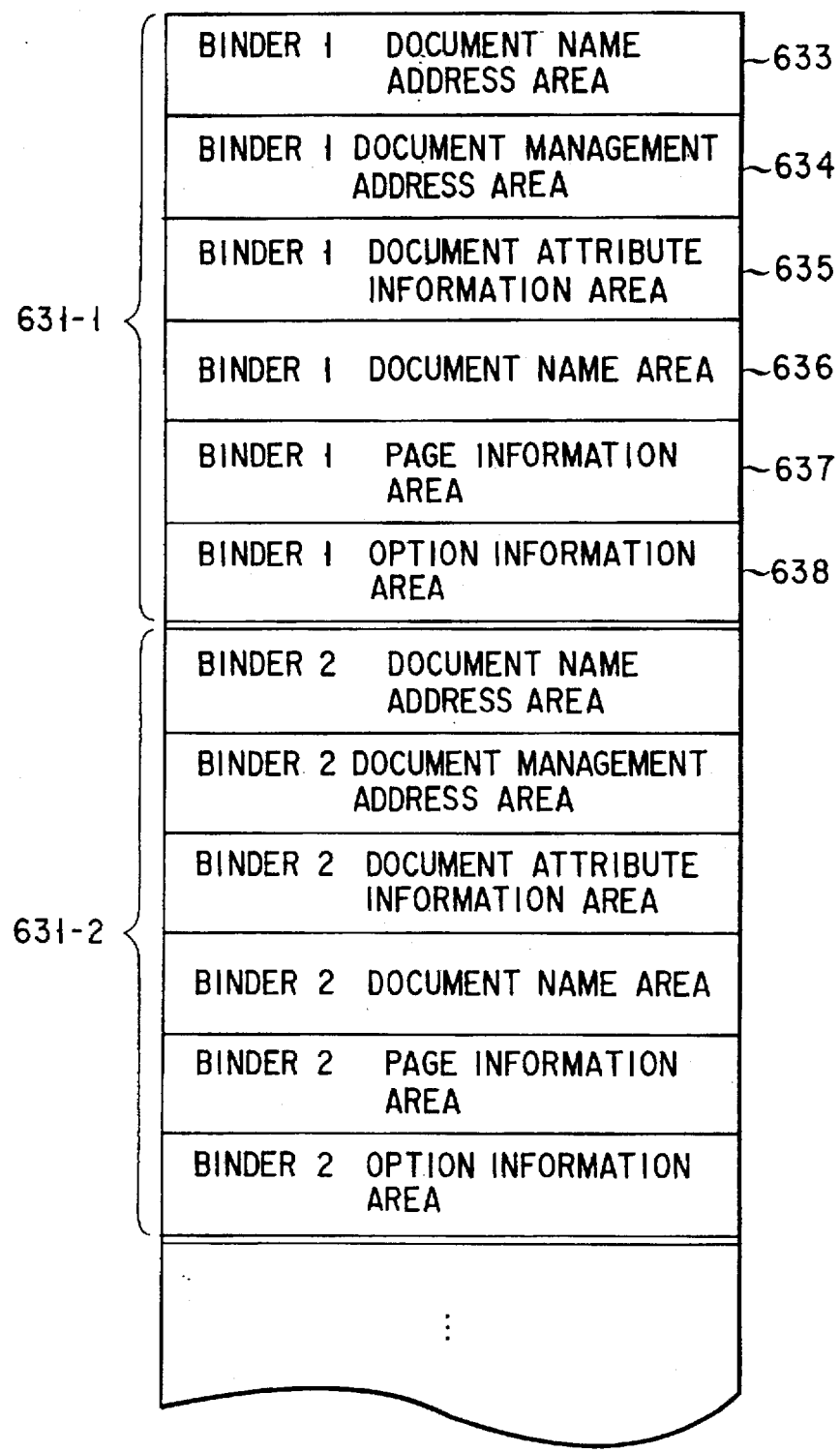
F I G. 19

| DOCUMENT 1 | NAME ADDRESS | 639-1 |
|---|---|---|
| DOCUMENT 2 | NAME ADDRESS | |
| ⋮ | | |
| DOCUMENT m | NAME ADDRESS | 639-m |
| ⋮ | | |
| DOCUMENT 1 | MANAGEMENT ADDRESS | |
| DOCUMENT 2 | MANAGEMENT ADDRESS | |
| ⋮ | | |
| DOCUMENT m | MANAGEMENT ADDRESS | |
| ⋮ | | |
| DOCUMENT 1 ATTRIBUTE INFORMATION | | |
| DOCUMENT 2 ATTRIBUTE INFORMATION | | |
| ⋮ | | |
| DOCUMENT m ATTRIBUTE INFORMATION | | |
| ⋮ | | |
| DOCUMENT 1 | NAME | |
| DOCUMENT 2 | NAME | |
| ⋮ | | |
| DOCUMENT m | NAME | |
| ⋮ | | |
| DOCUMENT 1 | PAGE INFORMATION | 641-1 |
| DOCUMENT 2 | PAGE INFORMATION | |
| ⋮ | | |
| DOCUMENT m | PAGE INFORMATION | 641-m |
| ⋮ | | |
| DOCUMENT 1 | OPTION INFORMATION | |
| DOCUMENT 2 | OPTION INFORMATION | |
| ⋮ | | |
| DOCUMENT m | OPTION INFORMATION | |
| ⋮ | | |

633 (comprising 639-1 ... 639-m and following rows), 634, 635, 636, 637 (comprising 641-1 ... 641-m), 638

F I G. 20

BINDER RETRIEVAL MENU '92.3.4 10:30

| RETRIEVAL SHEET INPUT | RETRIEVAL | CHANGE | DELETE | RETRIEVAL SHEET RE-OUTPUT |
|---|---|---|---|---|

| BINDER NAME ① | BINDER NAME ③ |
|---|---|
| BINDER NAME ② | BINDER NAME ④ |
| WEEKLY REPORT | |

| PREVIOUS PAGE | NEXT PAGE | | NEW REGISTRATION | END |
|---|---|---|---|---|

FIG. 22

DOCUMENT NAME RETRIEVAL MENU '92.3.4 10:32

BINDER NAME ④   3

| RETRIEVAL | CHANGE | DELETE |
|---|---|---|

24  '91 WEEKLY REPORT BY PERSON-IN-CHARGE DEC. (MANAGEMENT DIVISION)   '92.2.5

25  '91 RECREATION (REC. COMMITTEE)   '92.2.9

26  DOCUMENT NAME 26 (COMMENT COLUMN 26) '92.2.20

27  DOCUMENT NAME 27 (COMMENT COLUMN 27) '92.2.23

| PREVIOUS PAGE | NEXT PAGE | RETRIEVAL SHEET RE-OUTPUT | NEW REGISTRATION | END |
|---|---|---|---|---|

DOCUMENT RETRIEVAL MENU  '92.3.4  10:42

131: 26 DOCUMENT NAME 26 (COMMENT COLUMN 26) '92.2.20

132:
- ORIGINAL DOCUMENT SIZE: A 4 L
- NO. OF ORIGINAL DOCUMENT: 23
- NO. OF COPIES: (+) 1 (−)

133:
- ALL-PAGE COPY
- DESIGNATED PAGE COPY
- ✶ SPECIFY PAGE(S) BY NUMBER KEYS AND ENTER KEY
- 1.3.5.  — 133-1

134: ✶ FILE COPY : DEPRESS START BOTTON

135: STOP

FIG. 25

BINDER NEW REGISTRATION MENU  92.3.4  10:34

141: ✶ WRITE BINDER NAME AND COMMENTS

142: BINDER NAME — CLEAR — 142-2

143: COMMENT COLUMN — CLEAR — 143-2

144: STOP

145: END

```
┌─────────────────────────────────────────────────┐
│  DOCUMENT (NEW) REGISTRATION MENU (1)    '92.3.4│
│  ─────────────────────────────────────    10:36 │
│      ┌──────────────────────┐   PAGE NO. ┌──┐   │
│      │  BINDER NAME    ④   │   ┌──┐     │28│   │
│      └──────────────────────┘   │ 3│ ─  └──┘   │
│                                 └──┘            │
│  ✻ WRITE DOCUMENT NAME AND COMMENT              │
├─────────────────────────────────────────────────┤
│  DOCUMENT NAME                                  │
│                                                 │
│                                      ┌───────┐  │
│                                      │ CLEAR │  │
│                                      └───────┘  │
├─────────────────────────────────────────────────┤
│  COMMENT COLUMN                                 │
│                                                 │
│                                      ┌───────┐  │
│                                      │ CLEAR │  │
│                                      └───────┘  │
├─────────────────────────────────────────────────┤
│                         ┌──────┐   ┌──────┐     │
│                         │ STOP │   │ END  │     │
│                         └──────┘   └──────┘     │
└─────────────────────────────────────────────────┘
```

F I G. 26

```
┌─────────────────────────────────────────────────┐
│  DOCUMENT (NEW) REGISTRATION MENU (2)    '92.3.4│
│  ─────────────────────────────────────    10:40 │
│                                                 │
│      ┌──────────────────────┐   PAGE NO. ┌──┐   │
│      │  BINDER NAME    ④   │   ┌──┐     │28│   │
│      └──────────────────────┘   │ 3│ ─  └──┘   │
│                                 └──┘            │
│   ┌─────────────────────────────────────────┐   │
│   │ DOCUMENT NAME 28 (COMMENT COLUMN 28)'92.3.4│
│   └─────────────────────────────────────────┘   │
│   RETRIEVAL SHEET                               │
│        ┌───────┐  ┌──────────┐  ┌────────┐      │
│        │FORMING│  │ADDITIONAL│  │  NO    │      │
│        │       │  │ RECORD   │  │ RECORD │      │
│        └───────┘  └──────────┘  └────────┘      │
│   ┌─────────────────────────────────────────┐   │
│   │ CONFIRM ORIGINAL DOCUMENT SIZE,         │   │
│   │ SET RETRIEVAL SHEET,                    │   │
│   │ AND DEPRESS START BOTTOM                │   │
│   └─────────────────────────────────────────┘   │
│  ┌────────┐                          ┌──────┐   │
│  │PREVIOUS│                          │ STOP │   │
│  │ PAGE   │                          └──────┘   │
│  └────────┘                                     │
└─────────────────────────────────────────────────┘
```

F I G. 27

IMAGE PROCESSING APPARATUS USING RETRIEVAL SHEETS CAPABLE OF RECORDING ADDITIONAL RETRIEVAL INFORMATION

BACKGROUND OF THE INVENTION

1. Field of the Invention

The present invention relates generally to an image storing/forming apparatus having a storing device capable of storing document information read by a scanner and having a function of reading out the stored document information on an as-needed basis and printing out the document information by means of a printer, and more particularly to a digital copying machine having a scanner and a printer separately.

2. Description of the Related Art

Various types of image storing/forming apparatuses have conventionally been proposed, wherein document information read by a scanner is registered on a storage medium such as an optical disk, and thereafter the registered document information is retrieved on an as needed basis and printed out on a sheet by means of a printer. In addition, various means for registering and retrieving document information with easy operations have already been proposed. Of these means, particular attention has been paid to a simple retrieval processing method (Japanese Patent Application KOKAI Publication No. 3-196266) wherein a document abstract and retrieval information in units of a registered document are printed out on a single sheet, and the sheet is kept as a retrieval sheet of a registered document unit, and retrieval processing is performed by reading the retrieval information on the retrieval sheet by means of predetermined reading means.

In this prior art technique, however, the retrieval sheet is prepared in units of a registered document. Thus, a document registering operator must keep the output retrieval sheets by classifying them suitably. As the number of registered documents increases, the number of corresponding output retrieval sheets increases. Thus, there is a problem in managing retrieval sheets. For example, if the number of retrieval sheets increases, the retrieval sheets occupy a considerable storage space. Furthermore, if the number of retrieval sheets increases considerably, it becomes difficult to manage and handle the retrieval sheets which have been prepared to simplify the retrieval processing. Much time is needed to find out a desired retrieval sheet. As a result, the retrieval processing may become troublesome.

SUMMARY OF THE INVENTION

The object of the present invention is to provide an image storing/forming apparatus having means for retrieving document information by using a retrieval sheet, wherein the convenience of retrieval processing with use of a retrieval sheet is maintained, while a rapid increase in the amount of retrieval sheets due to an increase in the amount of registered documents is prevented and the management of the retrieval sheets is simplified, thereby performing document registration processing and retrieval processing with high operability.

According to one aspect of the invention, there is provided an image storing/forming apparatus comprising:

means for reading document information;

means for storing the document information read by the reading means;

means for receiving a retrieval sheet used for retrieving the document information stored in the storing means, the retrieval sheet having a plurality of printing areas for printing identification information to determine the document information stored in the storing means to be retrieved, means for printing the identification information of the document information stored in the storing means on a vacant printing area of the retrieval sheet received by the receiving means so that a plurality of identification information items of a plurality of document information items are printed additionally on the vacant printing area of the retrieval sheet; and means for outputting the retrieval sheet on which the identification information items are printed by the printing means.

According to still another aspect of the invention, there is provided an image processing method comprising the steps of:

reading out document information;

storing the read document information into a storing medium; and printing identification information for specifying the document information stored in the storing medium to a vacant printing area of a plurality of printing areas formed on the retrieval sheet provided to determine the document information stored in the storing medium, whereby a plurality of identification information items of a plurality of document information items are printed additionally to the vacant area of the retrieval sheet.

According to the present invention, there is provided a means for printing out the document identification information items of document information items recorded in the same binder, along with encoded retrieval information items, on a list-format retrieval sheet. In addition, there is provided a means for easily effecting additional recording of document identification information of additionally stored document information on the retrieval sheet of the associated binder. Thereby, the retrieval sheets can be managed easily and systematically. Furthermore, the storage space of retrieval sheets is reduced, as compared to the prior art, while the convenience of the retrieval processing with use of the retrieval sheet is maintained. Therefore, this invention can provide an image storing/forming apparatus with high operability in storage, management and retrieval processing of document information items.

Items of document identification information to be printed out on a retrieval sheet may be any identification information within the stored document management information. For example, a plurality of formats of the retrieval sheet are defined in advance in the system table ROM unit, and a control mechanism for selecting the format of the retrieval sheet on the control panel is provided. Thereby, two or more kinds of retrieval sheets can be prepared to meet the user's needs.

Additional objects and advantages of the invention will be set forth in the description which follows, and in part will be clear from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a perspective view showing the external appearance of an image storing/forming apparatus according to an embodiment of the present invention;

FIG. 2 is a block diagram schematically showing the entire circuit structure of the image storing/forming apparatus shown in FIG. 1;

FIGS. 3A to 3C are schematic views showing examples of formed retrieval sheets;

FIG. 9 shows a map structure of a main memory;

FIG. 10 shows a map structure of a program ROM;

FIG. 11A shows a map structure of a data table ROM;

FIG. 12 shows a map structure of a working RAM;

FIG. 16 shows a detailed structure of the binder management region;

FIG. 17 shows a structure of attribute information of the binder;

FIG. 18 shows a format structure of a document management area of a magnetic optical disk;

FIG. 19 shows a structure of a document management area of the binder;

FIG. 20 shows a detailed structure of the document management area of the binder;

FIG. 21A shows a structure of attribute information of document information;

FIG. 21B shows a structure of document attribute information;

FIG. 22 shows an example of a display screen of a binder retrieval menu;

FIG. 23 shows an example of a display screen of a document name retrieval menu;

FIG. 24 shows an example of a display screen of a document retrieval menu;

FIG. 25 shows an example of a display screen of a binder new registration menu;

FIG. 26 shows an example of a display screen of (new) document registration menu (1);

FIG. 27 shows an example of a display screen of (new) document registration menu (2);

DETAILED DESCRIPTION OF THE PREFERRED EMBODIMENTS

Figure 3A:
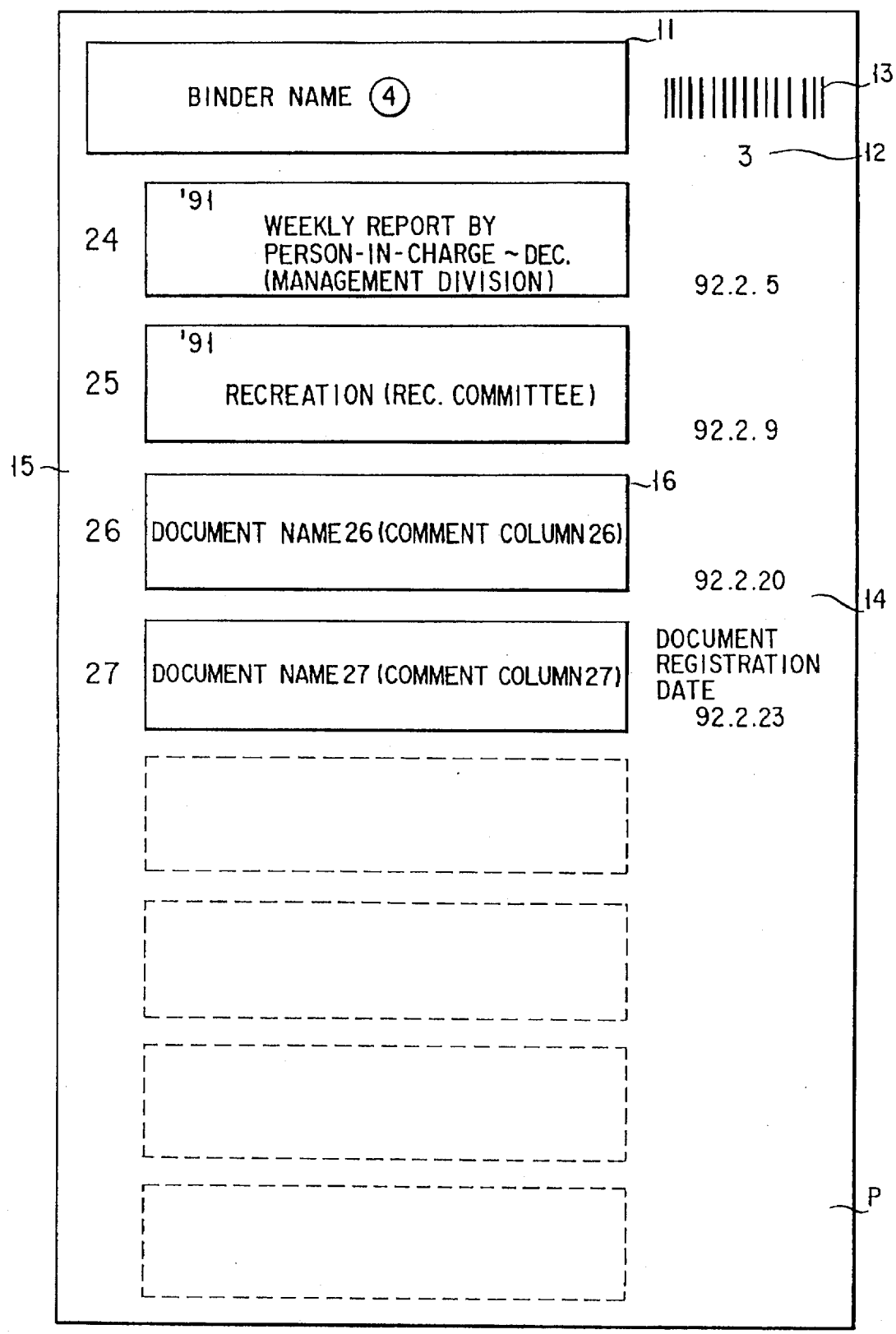

An embodiment of the present invention will now be described with reference to the accompanying drawings.

FIG. 1 shows the external appearance of an image storing/forming apparatus according to an embodiment of the present invention. In FIG. 1, an operation panel 2 is provided at an upper front part of an apparatus body 1. An original document table (not shown) formed of transparent glass is provided at an upper part of the body 1. An automatic document feeder (ADF) 3 for automatically feeding sheet-like original documents ("documents") one after another, which also serves as document hold cover, is openably provided over the original document table. A sheet feeder 5 having sheet feed cassettes 4 for feeding paper sheets as image formation media is provided at a bottom part of the body 1.

The right-hand part (in FIG. 1) of the body 1 is provided with a manual feed port (retrieval sheet receiving port) 6 for manually feeding a retrieval sheet P (described later in detail) and a manual feed table 7. The left-hand part (in FIG. 1) of the body 1 is provided with a discharge tray 8 for discharging sheets on which images are formed.

A retrieval code reader 9 is provided on a side portion of the manual feed table 7 within the manual feed port 6. The retrieval code reader 9 optically reads a retrieval code recorded on a side portion of a tip portion of inserted retrieval sheet P. In this case, the retrieval code reader 9 performs a reading operation in the state in which the inserted retrieval sheet P is stopped at a predetermined position on the manual feed table 7.

A disk insertion port 10 for insertion of a magnetic optical (MO) disk serving as storage medium for storing document information is formed at a front face of the body 1 below the operation panel 2. An MO disk storage apparatus (not shown) is situated within the body 1, facing the disk insertion port 10.

The body 1 contains a scanner (input means) for optically scanning and inputting an image (document information) of an original document set on the document table, and a laser printer (output means) for printing out document information input by the scanner or retrieved document information onto a sheet fed by the sheet feeder 5 and also printing out retrieval sheets P (described later). These means will be described later in detail with reference to FIG. 2.

FIG. 2 schematically shows the entire structure of the image storing/forming apparatus according to the embodiment. The image storing/forming apparatus comprises a scanner (input means) 21 for inputting document information; a printer (output means) 22 for printing out document information and a retrieval sheet P; an interface (hereafter called "SPIF") including an image processing unit for image processing between the scanner 21, the printer 22, a system bus 29 (described later) and an image bus 30 (described later); an image storage unit 24 for temporarily storing input/output image information such as document information or retrieval sheet information; a magnetic optical (MO) disk storage device 25 for storing (registering) document information and document identification information; an interface 26 (hereinafter called "MODIF") of the MO disk storage device 25; an encoding/decoding unit 27 for compressing and encoding document information on the image bus 30 and outputting the encoded information to the system bus 29, and expanding and decoding the compressed/encoded data from the system bus 29 and outputting the decoded data to the image bus 30, when document information is stored in an MO disk; and a control unit 28 for overall control of the apparatus; the system bus 30 used exclusively for image information for high-speed transfer of image information between the respective devices; the operation panel 2; and a retrieval code reader 9.

In the scanner 21, document information of an original document placed on the document table is read by one-line-unit scanning in accordance with an instruction from the control unit 28 by means of a CCD line-sensor (not shown) comprising a light-receiving element array. The density of read image is converted to 8-bit digital data, and the 8-bit digital data is output, as time-sequence digital data, to the SPIF 23 including the image processing unit along with sync signals.

The printer 22 has an image forming section (not shown) in which a laser optical system (not shown) is combined with an electrophotographic method for effecting image formation on a sheet. In accordance with an instruction from the controller 28, the image forming section receives 8-bit digital image information on the SPIF 23 in synchronism with sync signals. Thereby, an electrostatic latent image is formed on a photosensitive drum (not shown) by a laser beam having a pulse width corresponding to the magnitude of image information. Then, the electrostatic latent image is made visible by developing or visualizing means (not shown). The visible image is transferred onto a sheet fed from the sheet feeder 5 by transfer means (not shown). The image transferred onto the sheet is fixed by fixing means (not shown) and printed out.

FIG. 3A schematically shows the retrieval sheet P prepared by the image storing/forming apparatus of the present embodiment. The sheet P includes a binder name section 11; an in-binder page number 12; a retrieval code 13 representing, as bar-coded retrieval information, a cabinet number, a binder number, an in-binder page number, a retrieval sheet number and the like; a document registration date 14; an in-binder document number 15; and a document name section 16. Broken lines indicate empty spaces for additionally writing retrieval information of a document which is to be additionally recorded in the same binder.

The procedure for preparing retrieval sheets P will be described later. The information in the binder name section 11 and document name section 16 is bit-map image information obtained by resolution-converting to a predetermined information amount the handwritten information input from the panel 2.

In this embodiment, the retrieval code 13 is a bar code recorded at a predetermined position on the right-hand part (in FIG. 3A) of the tip portion of retrieval sheet P.

FIGS. 3B, 3C show schematically examples of the retrieval sheet P which can be prepared by an image forming apparatus according to different embodiments of the present invention, in which output item information which includes document name information and becomes document identification information is character code information.

Figure 4:
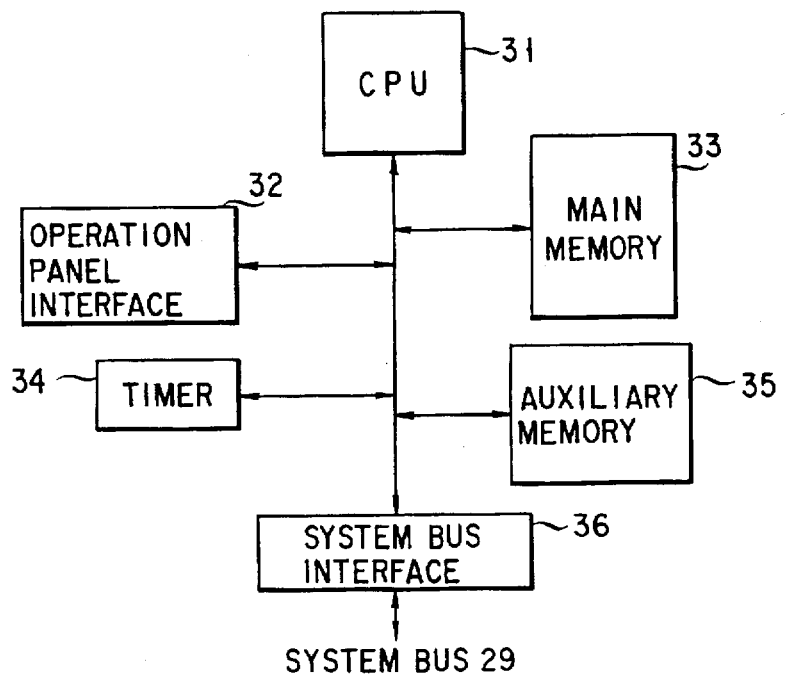
FIG. 4 is a block diagram schematically showing the circuit structure of a control unit.

FIG. 4 schematically shows the structure of the control unit 28, which comprises a CPU (Central Processing Unit) 31 for effecting various controls, an interface 32 between the operation panel 2 and the control unit 28, a main memory 33 for storing various control programs and various management information, an auxiliary memory 35, a timer 34, and an interface 36 between the system bus 29 and the control unit 28.

Figure 5:
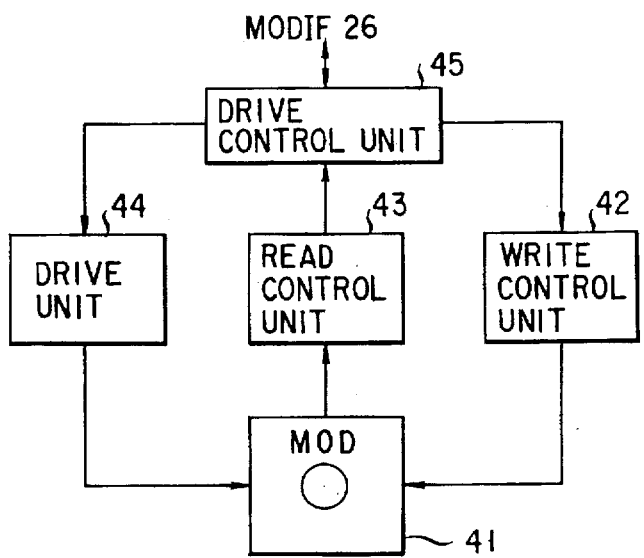
FIG. 5 is a block diagram schematically showing the circuit structure of a magnetic optical disk storage apparatus.

FIG. 5 schematically shows the structure of the MO disk storage apparatus 25, which comprises a magnetic optical disk (MOD) 41, a write control unit 42 for controlling a write operation on the MOD 41, a read control unit 43 for controlling a read operation on the MOD 41, a drive motor 44 for rotating the MOD 41, and a drive control unit 45 for controlling the write control unit 42, read control unit 43 and drive motor 44, the drive control unit 45 including a data buffer (not shown) for temporarily storing image data fed from the MODIF 26.

Figure 6:
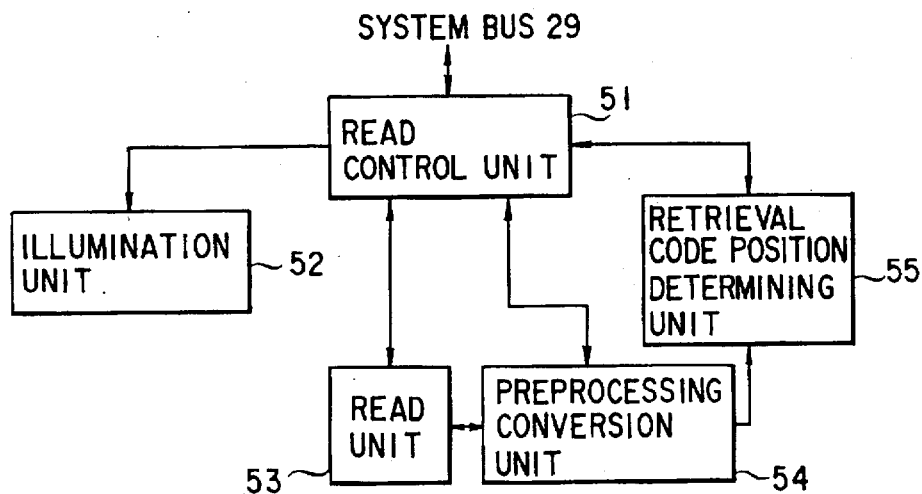
FIG. 6 is a block diagram schematically showing the circuit structure of a retrieval code reading unit.

FIG. 6 schematically shows the structure of the retrieval code reader 9. The retrieval code reader 9 reads the retrieval code 13 on the retrieval sheet P set at the retrieval sheet receiving port or manual feed port 6 of the printer 22. Thereby, it judges whether the retrieval sheet P is the retrieval sheet which has already been output to the associated binder, and whether the retrieval sheet P is situated in the correct position.

Specifically, in accordance with an instruction from the control unit 28, a read control unit 51 controls an illumination unit 52, a read unit 53 constituted by a line sensor (not shown), and a preprocessing conversion unit 54 for performing shading correction processing, etc. Thus, density information of an image at a predetermined location on the retrieval sheet P is read and converted to digital data by the preprocessing conversion unit 54. Thereafter, the retrieval code position determining unit 55 performs format determination by judging whether the digital data corresponds to the retrieval code. If it is determined that the digital data corresponds to the retrieval code, the digital is converted to numerical values represented by the corresponding retrieval code, i.e. numerical values representing a cabinet number, a binder number and an in-binder page number. These values are output to the system bus 29 via the read control unit 51. If it is determined that the digital data does not correspond to the retrieval code, numeral values indicating that the read density information does not correspond to the retrieval code is output to the system bus 29 via the read control unit 51.

The control unit 28 receives via the system bus 29 numeral values output from the retrieval code reader 9 and performs various control processes using the retrieval sheet P. If the control unit 28 receives numerical values indicating that the read density information does not correspond to the retrieval code, it is determined that the correct retrieval sheet P is not situated in the correct position, and the operation panel 2 is controlled to display a message to the effect that the correct retrieval sheet P should be set once again in the correct direction.

Figure 7:
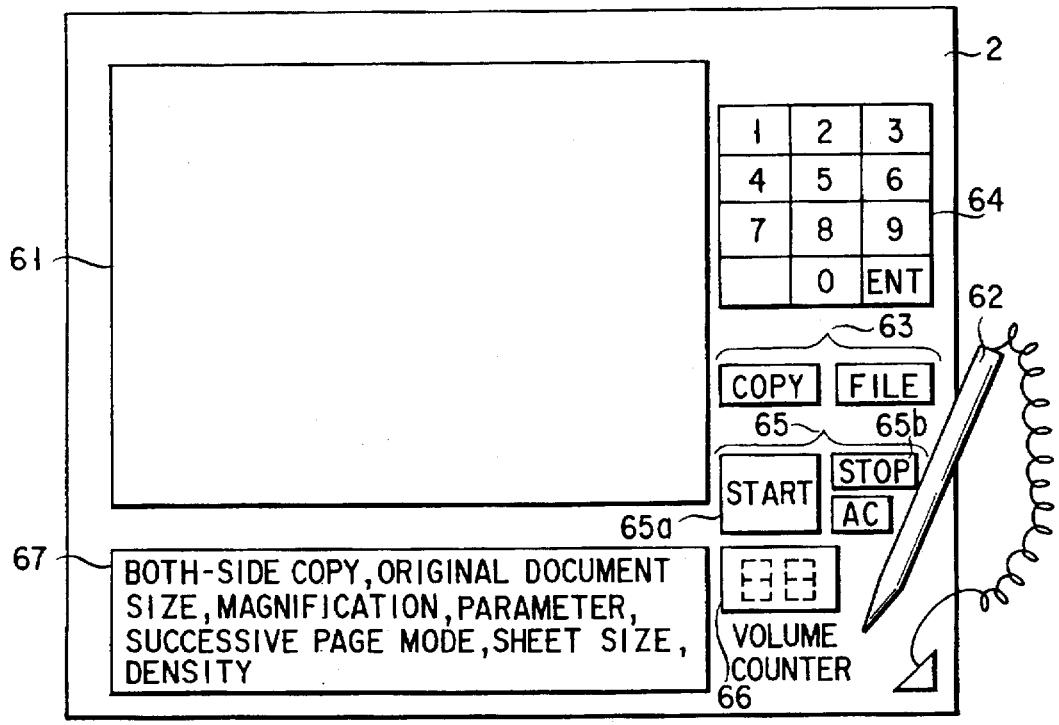
FIG. 7 is a plan view schematically showing the external appearance of a control panel.

FIG. 7 schematically shows the external appearance of the operation panel 2. In FIG. 7, a touch-panel display unit includes a liquid-crystal display (LCD) section 61 and a conductive pen 62 for a touch panel. A control panel unit includes a selection key section 63 for selecting an operation mode (a copy mode or a file mode), a numerical key section 64 for inputting the number of copies, an operation control switch section 65 having a start key, a stop key, a clear key and a cancel key, a volume counter 66, and a parameter setting section 67 for setting various parameters relating to the copy mode such as the magnification, original document size, sheet size and successive page mode.

Figure 8:
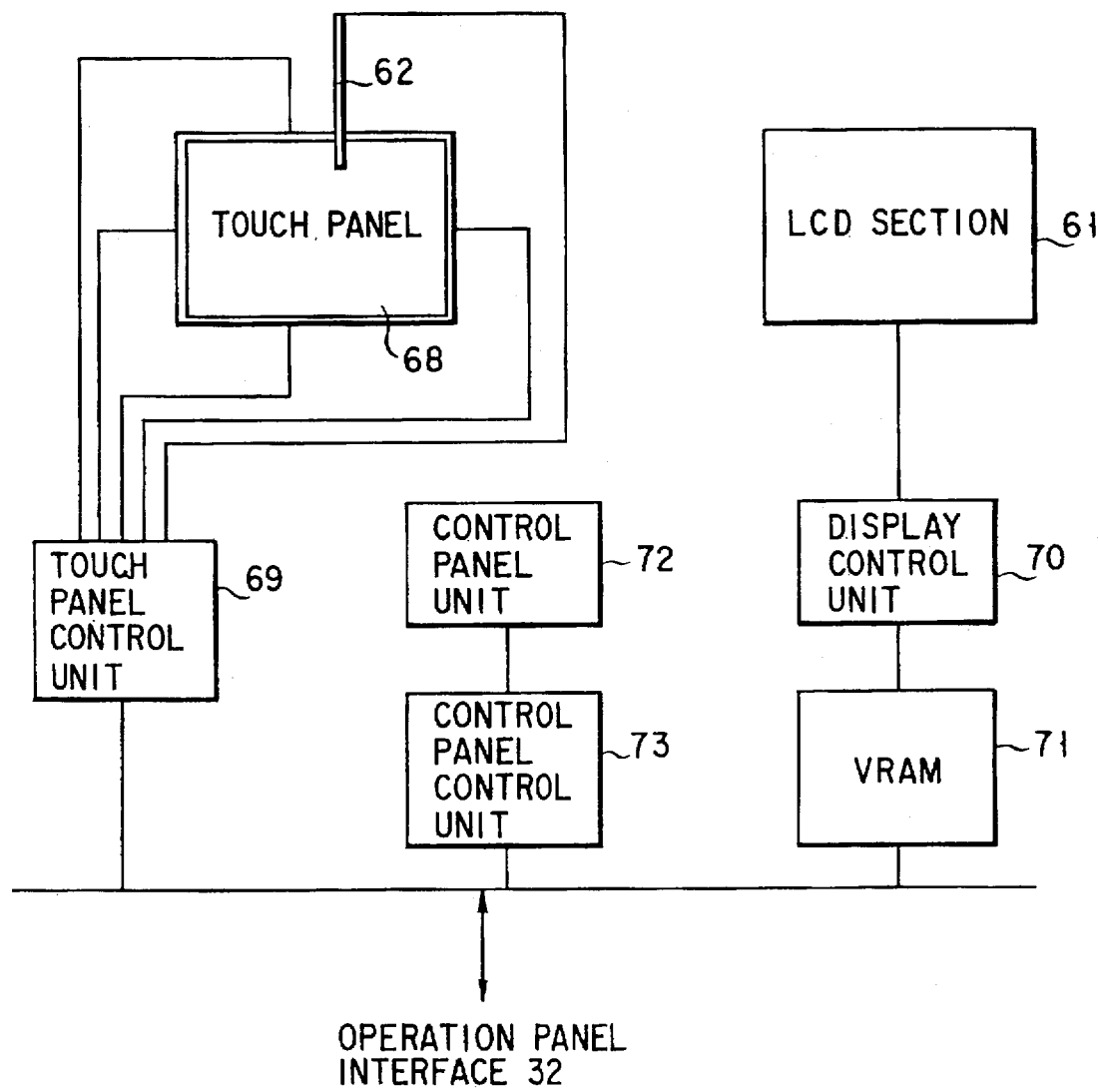
FIG. 8 is a block diagram schematically showing the circuit structure of the control panel.

FIG. 8 is block diagram showing schematically the structure of the operation panel 2. In FIG. 8, a touch panel 68 is normally constituted such that a transparent electrically conductive film having uniform resistance is coated on both sides of a transparent glass substrate. A circuit network and electrodes for detecting X- and Y-directional positions are formed around the touch panel 68. The touch panel 68 is provided on the surface of a liquid crystal display unit 61. When the touch panel 68 is touched by a custom-designed conductive pen 62, the resistance value of the touched portion of the electrically conductive film is varied. As a result, the resistance of the circuit network, i.e. the current flowing in the network, varies. Information representing the variation in current is output from the touch panel 68.

A touch panel control unit 69 supplies power to the touch panel 68. In addition, the control unit 69 successively reads current (resistance) variation information from the circuit network, converts the variation information to position coordinates, and sets the position coordinates in a built-in register (buffer). Actually, the touch panel 68 lies over the LCD section 61, and the display image on the LCD section 61 is viewed through the touch panel 68. Inversely, if a certain region on the screen of the LCD section 61 is touched by the pen 62 or the finger, the touch panel 68 is regarded as having been touched.

The display section comprises an LCD section 61, a display control unit 70 and a video memory (VRAM) 71 for storing image data in units of a pixel. The image data in the video memory 71 is successively read out from the display control unit 70 and displayed on the LCD section 61. The control panel unit 72 (parts 62 to 67 in FIG. 7) is controlled by the control panel control unit 73.

The operation panel 2 is controlled via the operation panel interface 32 by the CPU 31 of the control unit 28 by executing programs stored in a hard-disk apparatus or ROM 35 serving as an auxiliary memory of the main memory 33 by using a RAM in the main memory 33 which is used as working memory.

Of the programs stored in the auxiliary memory, a main program is one for forming menu screen data and setting it in the video memory 71 in order to display a menu on the LCD section 61. Another main program is one for identifying a selected item from the relationship between a touched position on the touch panel 68 and the data displayed on the LCD section 61 when an item is selected by the operator's touching the touch panel 68, thereby performing a corresponding display operation, etc. Still another main program is one for successively reading out position information set in the register by the touch panel control unit 69, interpolating the position data items suitably, and setting the obtained data in the video memory 71, when a continuous curve is input by the pen 62. Still another main program is one for resolution-converting images of a binder name and a document name input by the pen 62 to bit-map images of predetermined information amount and registering the bit-map images in the MO disk.

FIG. 9 shows the map structure of the main memory 33. The main memory 33 comprises a program ROM (Read-Only Memory) 331 storing programs for controlling various systems, a data table ROM 332 storing various control/management data, a working RAM (Random-Access-Memory) 333 for executing various the programs in the program ROM 331 and temporarily storing various control/management data, and an auxiliary memory (VRAM) 334 of the operation panel 2. The auxiliary memory 334 is used when a resolution conversion process of image information input by the pen 72 is performed by the program for obtaining the bit-map image information of the binder name and document name.

FIG. 10 shows the map structure of the program ROM 331 comprising a system control management program section, an operation panel control program section, an MO disk storage device control program section, an I/O unit control program section, a retrieval code reader control program section, and a retrieval sheet preparation/additional preparation section.

FIG. 11A shows the map structure of the data table ROM 332 comprising a system control management data table section, an operation panel control data table section, an MO disk storage device control data table section, an I/O unit control data table section, a retrieval code reader control data table section, a character generator, and a retrieval sheet format defining section.

Figure 11B:
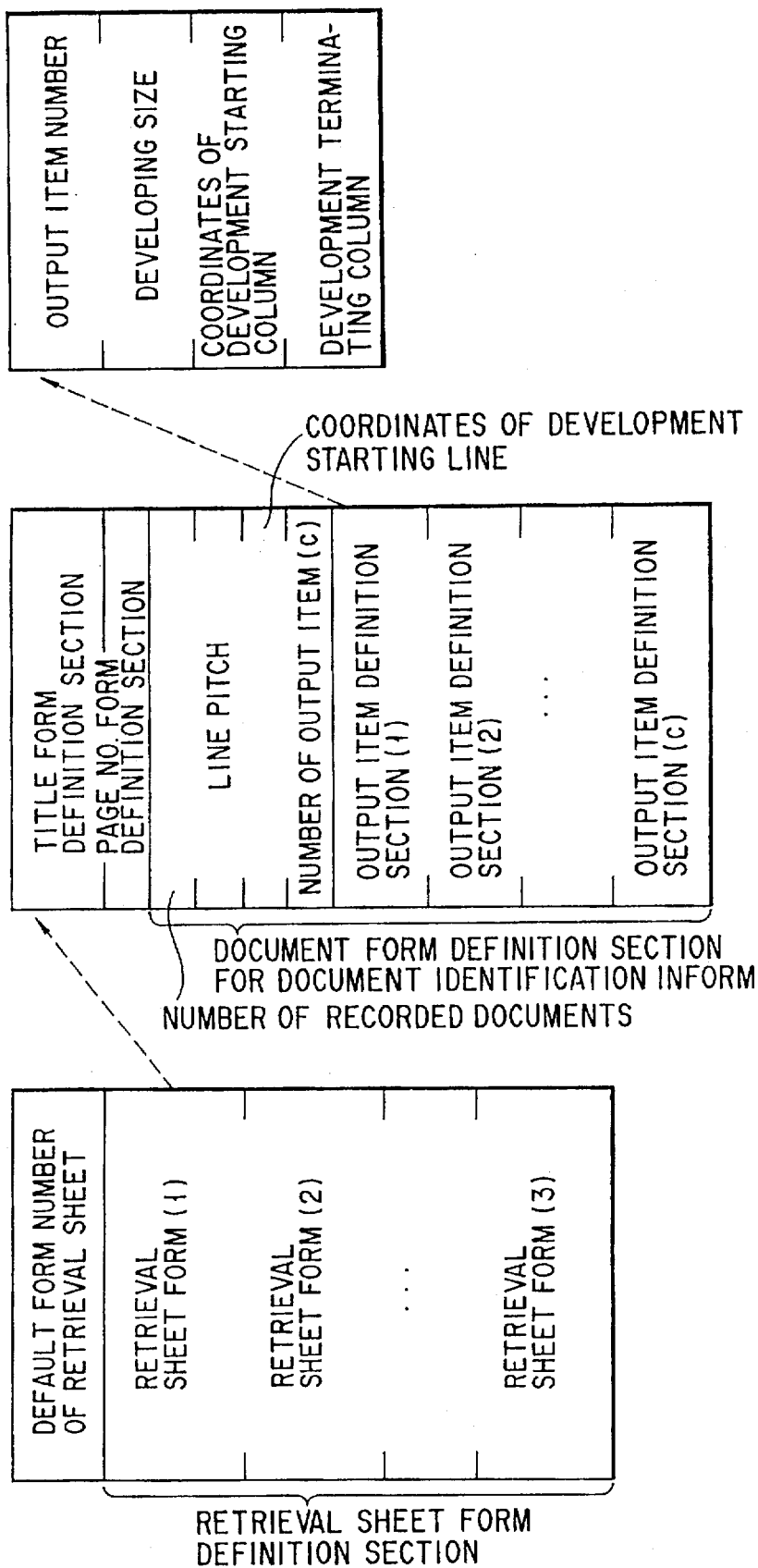
FIG. 11B shows a map structure of a retrieval sheet format definition section.

FIG. 11B shows the details of the retrieval sheet format defining section. Plural formats are registered in advance according to default format numbers 1, 2, . . . , x of retrieval sheets. In FIG. 11B, for example, the format definition contents of the retrieval sheet format (1) comprises a title format definition section represented by binder name information or the like, a page number format definition section defining a page number output position, and an output format definition section of each document identification information item.

Each document identification information format definition section comprises an output format definition section relating to the number of output documents in a retrieval sheet, a new paragraph start pitch, position information of development start line, and each document identification information item (referred to as "output item").

Furthermore, the output item definition section comprises an output item number for identifying the output item, information on the development size of output item, column information of output area, etc.

FIG. 12 shows the map structure of the working RAM 333 comprising a various control program working section, an operation panel control data management section, an MO disk storage device control data management section, an MO disk management information section, a registered document management information section, and a current format definition section of retrieval sheet. When the retrieval sheet is prepared, the current set value (format number) of the retrieval sheet format is referred to, and the retrieval sheet definition section (see FIG. 11B) corresponding to the format number is retrieved. In accordance with the defined format, the retrieval sheet is prepared. The method of retrieval sheet format management is not limited to that shown in FIG. 12. For example, the current format definition section of a retrieval sheet may be provided in the optical disk management information region of an optical disk, thereby managing the retrieval sheet format. In this case, format management can be performed on a cabinet-by-cabinet basis or a binder-by-binder basis. In the apparatus of the present embodiment, for the purpose of simplicity in description, the format was described as being managed on the system program RAM. In addition, although a description of the procedure for setting the retrieval sheet format in the apparatus of this embodiment is omitted, it is possible to select a desired format defined in FIG. 11B in a menu format on the operation panel (see FIG. 7). In the present embodiment, it is supposed that the retrieval sheet format as shown in FIG. 3A is selected.

Control programs, which cannot be managed by the main memory 33, and MO disk management information are stored and managed by the hard-disk apparatus, etc. in the auxiliary memory 35. Upon request from the system control program, such control programs and information are loaded and saved at suitable time.

FIGS. 13 to 21B show structures of management information on the MO disk (MOD) 41 and document information formats.

Figure 13:
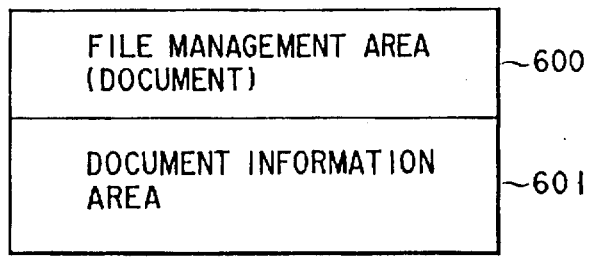
FIG. 13 shows a whole file format structure of a magnetic optical disk.

FIG. 13 shows the entire structure of the MO disk comprising a file management area 600 for managing document information on the MO disk 41, and a document information area 601 storing document information itself.

Figure 14:
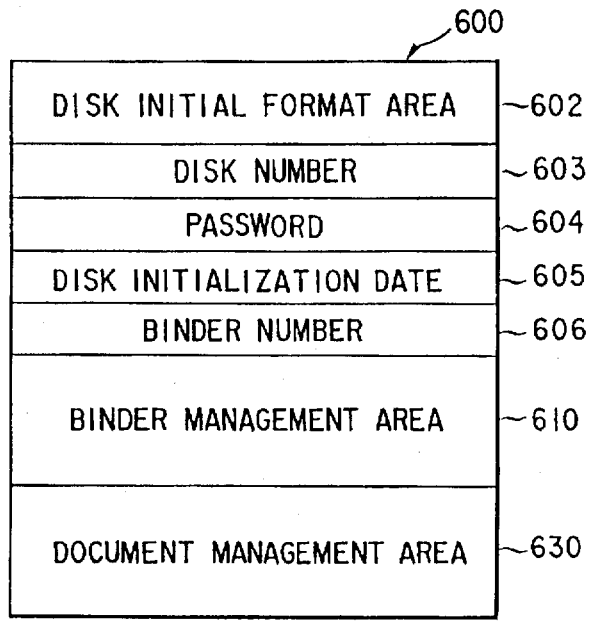
FIG. 14 shows a structure of a file management area.

FIG. 14 shows the structure of the file management area 600 which comprises a disk initial format area 602 for storing an initial address at the time of MO disk manufacture and initialization, a disk number 603 for storing a disk number or an identification number of the MO disk, a password 604 for storing a password of the owner of the MO disk, a disk initialization date 605 for storing the date of initialization of the MO disk 41, a binder number 606 for storing the number of binders registered in the MO disk 41, a binder management area 610 for storing management information of each binder, and a document management area 630 for managing document information registered in each binder.

Figure 15:
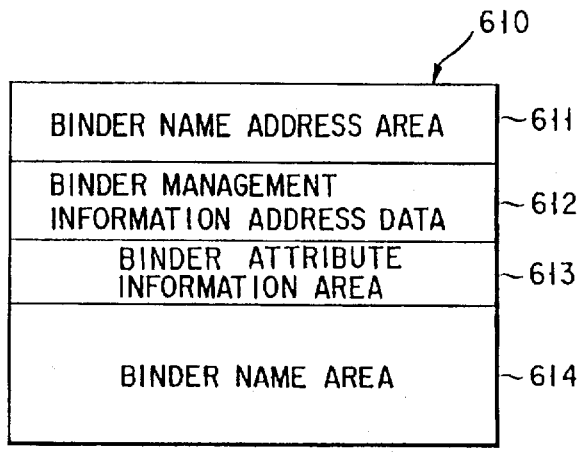
FIG. 15 shows a structure of a binder management area.

FIG. 15 shows the structure of the binder management area 610 comprising a binder name address area 611 for storing a top address of a binder name stored in a binder name area 614 (described later), a binder management information address area 612 for storing a top address of document management information in each binder stored in the document management area 630, a binder attribute information area 613 for storing various attribute information of each binder, and a binder name area 614 for storing each binder name.

FIG. 16 shows the details of the four areas 611 to 614. In FIG. 16, an n-number of binders are registered in an area 615 of binder number (1) to an area 616 of binder number (n). In this embodiment, the binder name area 614 stores bit-image information which is input from the touch panel 68 by use of the pen 62 and converted to a predetermined amount of information in a two-value system, and the binder name area is referred to as binder names of the retrieval sheet P and display menu. As will be described later, there is provided an area for storing a storage format as binder attribute information 623 (shown in FIG. 17), and therefore a compression code obtained by compressing a character code or bit-image information can be used as a binder name in a desired storage format.

FIG. 17 shows the structure of attribute information 167 of each binder in the binder attribute information area 613. A binder identification number 620 is a number inherent to a binder for identifying the binder. In the present embodiment, binder numbers (1) to (n) shown in FIG. 16 are used.

A binder registration date area 621 stores the date of registration of the binder. A number-of-document-files area 622 stores the number of document files registered in the binders. A binder attribute information area 623 stores binder management information relating to the storage format of the binder name (e.g. whether the binder name is of the character code format or the bit-image format) and the retrieval sheets have been output in units of a page. In this embodiment, the data items in the binder attribute information area 167 are referred to at any time and updated, when the binder registration/deletion processing, binder name updating processing, and various processing using the retrieval sheet P are performed.

FIGS. 18 to 21B show the details of the document management area 630 shown in FIG. 14.

In FIG. 18, registered documents of an n-number of binders of binder numbers (1) to (n) are managed in areas 631-1, . . . , 631-n.

FIG. 19 shows the details of the document management area 631-1, . . . , 631-n of each binder, e.g. area 631-1. Each document management area of a binder unit comprises a document name address area 633 for storing a top address at which the document name of document information registered in the binder is stored; a document management address area 634 for storing a top address of page-unit management information of each document information unit stored in a page information area 637 (described later), a document attribute information area 635 for storing various attribute information units of each document, a document name area 636 for storing a document name of registered document information, a page information area 637 for storing page-unit information of registered document information, and an option information area 638 for storing option information of a document information unit. The other areas are constructed similarly.

FIG. 20 shows details of the above six areas 633 to 638. In each of the areas 633 to 638, the information items relating to the documents of document numbers (1) to (m) are registered. For example, name addresses of areas 639-1 to 639-m are registered in the document name address area 633. In this embodiment, the document name region 636 stores, as well as the binder name, bit-image information which is input from the touch panel 68 by use of the custom-designed pen 62 and converted to a predetermined two-value information amount by a predetermined control system. The data in area 636 is referred to as document names of the retrieval sheet P and document menu. Like the binder name area 614, a compression code obtained by compressing a character code or bit-image information can be used as a document name in a desired storage format.

Attribute information of each document information unit in the document attribute information area 635 has a structure as shown in FIG. 21A. A document identification number 650 is a number inherent to document information for identifying the document information. In this embodiment, document numbers (1) to (m) shown in FIG. 20 are used.

A document registration 651 is an area for storing the registration date of document information. A page number 652 is an area for storing the number of pages in document information. An original document size 653 is an area for storing the size of a registered document. When original documents of different sizes are included in document information, the original document size 653 stores an inherent code indicating that the sizes of original documents differ from page to page, and the page information area 637 stores the original size of page unit.

In this embodiment, it is supposed that the document-unit automatic registration is performed by an automatic document feeder (ADF). Thus, attribute information of page unit in a registered document is not used.

FIG. 21B shows the structure of document attribute information 654 of each document. A document attribute information area comprises a document information delete flag section indicating whether registered document information has been deleted or is effective, a document name register mode indicating whether the storage mode of document name is a character code mode or a bit image mode, a document information register mode section which stores a document information gradation conversion process mode, and a retrieval sheet output flag section indicating whether document identification information has been output on retrieval sheet P. The document attribute information is referred to and updated any time when a process using retrieval sheet P has been carried out.

Document attribute information 654 stores document attribute/management information as to the document name storage format (e.g. whether the document name area is of the character code format or the bit-image format), as to whether the above-mentioned document identification information items such as document name or registration date have been output on the retrieval sheets, and whether document information is effective or not (e.g. whether document information has already been deleted or renamed). The document attribute information 654 is referred to at any time and updated, when the document name updating processing, document deleting processing and various processing using the retrieval sheet P are performed.

As regards the image storing/forming apparatus having the above structure, the binder forming procedure, document registration procedure, document retrieval procedure, retrieval sheet (P) forming procedure, additional recording procedure for adding identification information of a registered document on the retrieval sheet P, and retrieval procedure using the retrieval sheet P, in the file mode of the apparatus, will now be described with reference to FIGS. 22 to 27 and FIGS. 28A to 30E. FIGS. 22 to 27 show operation procedures of menu screens shown on the LCD section 61 operating in the file mode, and FIGS. 28A to 30E are flow charts. It should be noted that the following operations are executed by the control unit 28 which controls the respective components of the system.

When the file mode is selected by the operation mode selection key section 63 on the operation panel 2, the control unit 28 confirms that the MO disk 41 is set in the MO disk storage apparatus 25. Then, the data in the file management area 600 of the MO disk 41 is loaded in the working RAM 333 in the main memory 33.

In the file mode, the associated file management area of the RAM 333 is accessed to refer to and update the document management information. When the file mode is finished, the data in the working RAM 333 is returned to the file management area 600 in the MO disk 41. Thus, the management information on the MO disk 41 is updated.

In the following description, diagrams relating to the MO disk 41 as shown in FIGS. 13 to 21 are used for the purpose of simplification. However, in fact, the associated areas in the corresponding working RAM 333 are accessed.

FIG. 22 shows the initial display menu of the file mode. The control unit 28 retrieves the binder management area 610 of the MO disk 41 by the operation panel control program in the program ROM 331. The data in the binder name area 614 which has already been formed and registered on the basis of bit-image information is, along with the associated display menu items in the data table ROM 332, is developed in the video memory 71. Thereby, the screen of "BINDER RETRIEVAL MENU" as shown in FIG. 22 is displayed.

This display screen comprises a display menu title section 101, an operation mode selection section 102, a binder name display/selection section 103, a page change section 104, a binder new registration menu 105, and a file mode end menu 106. When the end menu is designated, the data in the file management area of the MO disk 41 in the working RAM 333 is stored in the file management area 600 in the MO disk 41, as described above, and the mounting of the MO disk 41 is released and the operation mode is returned to the initial "COPY MODE".

The procedure for forming the binder or the document information registration destination classification name will now be described. On the display screen of FIG. 22, when the new registration menu 105 is selected, the screen of "BINDER NEW REGISTRATION MENU" shown in FIG. 25 is displayed. On the display screen, reference numeral 141 denotes a menu title section. Using the touch panel pen 62, the name of a new binder and additional information of the binder are hand-written within frames 142 and 143. In this case, erroneous input data handwritten in the frames can be erased by selecting clear sections 142-2 and 143-2, and correct data is input once again.

When a stop section 144 is selected, the formation of the binder is stopped, and the menu screen is returned to the "BINDER RETRIEVAL MENU" shown in FIG. 22. In addition, by designating the end section 145, the actual binder registration processing is performed. Specifically, the binder number 606 in the file management area 600 is updated, and a new binder number is issued. The address of the associated binder name area 614 is registered in the binder name address area 611 corresponding to the new binder number. In addition, the displayed binder name image information developed on the video memory 71 and the image information of the additional information is converted to a predetermined amount of two-value bit-image information by a predetermined control system and is registered in the associated binder name area.

In the binder management information address area 612 corresponding to the new binder number, the address of the corresponding binder attribute information area 613 is registered. In the binder attribute information area 613, the binder identification number 620, binder registration date 621, number-of-document 622 (initial value=0), binder attribute information 623 (e.g. presence/absence of output of retrieval sheet P) are registered under the control of the control unit 28. As a result, the screen of "BINDER RETRIEVAL MENU" is displayed once again, with the new binder name added to the binder name display/selection section 103.

In FIG. 22, the "SEARCH" operation mode is initially selected in the operation mode selection section 102. When the displayed menu in the binder name display/selection section 103 is selected, the control unit 28 retrieves the document management area 631 registered in the associated binder in the document management area 630 in the MO disk 41. The data in the document name area 636 and the associated document identification information such as document identification number 650 and document registration date 651, as well as the other associated display menu items in the data table ROM 332, are developed in the video memory 71. Thus, the screen of "DOCUMENT NAME RETRIEVAL MENU" shown in FIG. 23 is displayed.

In the display screen of FIG. 23, a display menu title section 121 displays a binder name selected in the binder retrieval menu. Thus, the selected binder can be confirmed.

Figure 28A:
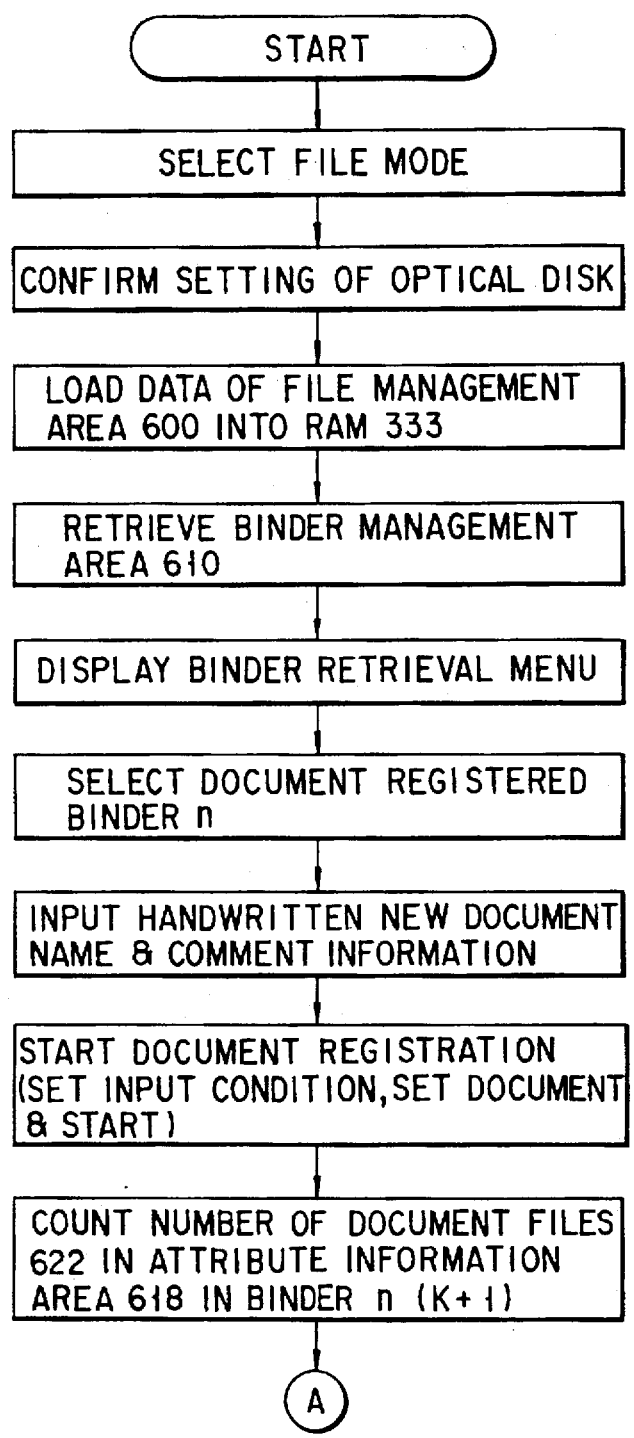
FIGS. 28A and 28B are flow charts showing the procedure for document registration.
Figure 28B:
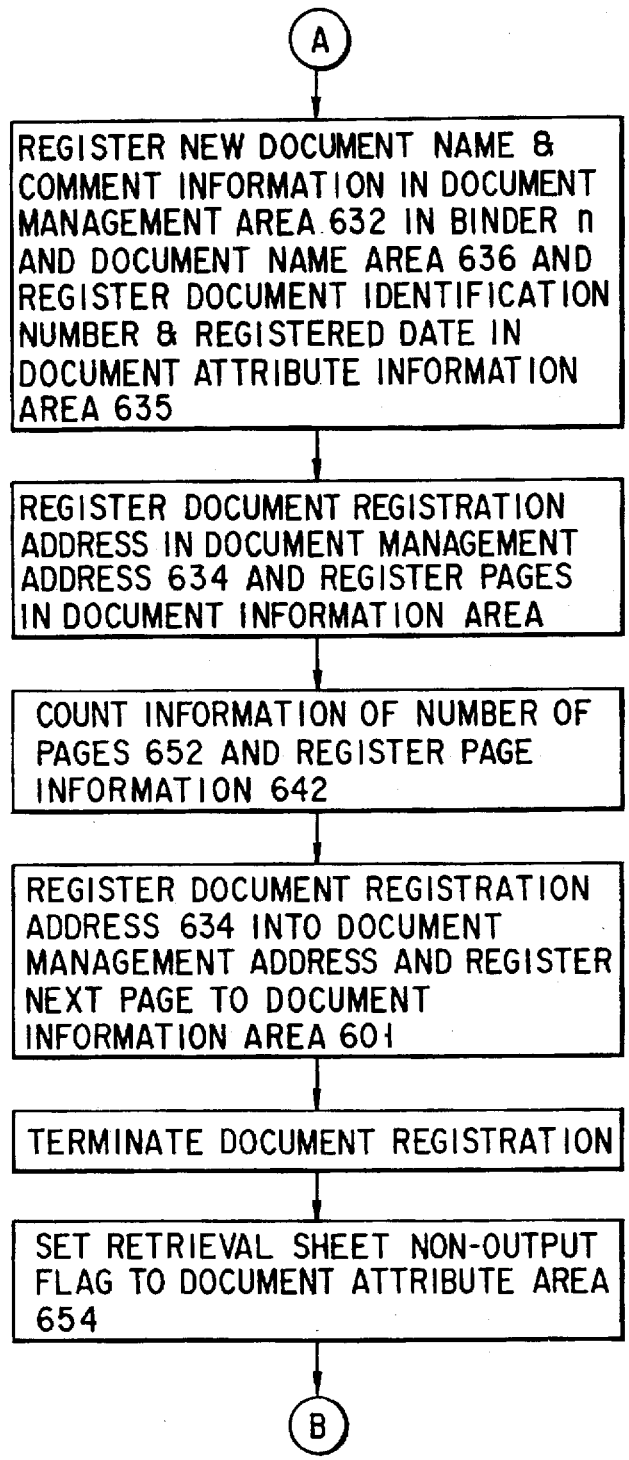

The document registration procedure for registering document information will now be described with reference to FIGS. 28A and 28B. When the new registration menu 128 is selected on the display screen of FIG. 23, "DOCUMENT REGISTRATION MENU (1)" of FIG. 26 is displayed. In the display screen, reference numeral 151 denotes a menu title section which displays an in-binder retrieval sheet number 151-2 and a registered document identification number 151-3 which are updated by the control unit 28 on the basis of the binder name of the document registration destination and the number-of-documents 622 in the binder management area 610.

The operation on the operation panel 2 is similar to that for the above-described binder formation procedure. The name of the new document and additional information relating to the document (comment information) are input in the frames 152 and 153 by handwriting by use of the touch panel pen 62. In this case, erroneous input data can be erased by selecting clear sections 152-2 and 153-2, and correct data is input once again.

By selecting a stop section 154, the new registration of document information is stopped and the screen is restored to the "DOCUMENT NAME RETRIEVAL MENU" of FIG. 23. In addition, by designating an end section 155, the displayed document name image information developed on the video memory 71 and image information of additional information are converted to a predetermined amount of two-value bit-image information by a predetermined control system and are displayed on the "DOCUMENT REGISTRATION MENU (2)" of FIG. 27 along with other display items. Thus, the document registration condition is confirmed.

In FIG. 27, a menu title section 161 displays a registration destination binder name, a document name and a page number on the retrieval sheet P. In a mode menu section 162, forming of the retrieval sheet P or additional recording is selected in accordance with the registration of document information. If the retrieval sheet P of the associated binder has already been output, "ADDITIONAL RECORD" is selected as an initial value. If that sheet P has not yet been output, "OUTPUT" is selected as an initial value. The judgment of output/non-output of the retrieval sheet P is effected by searing a flag (not shown) of the associated item of the binder attribute information 623 in the binder management area 610.

In accordance with an instruction from a message display section 163, a document (original) to be registered is set on the automatic document feeder 3. By depressing the start key on the operation panel 2, the scanner 21 is actuated to execute the document registration processing. At this time, it is necessary to register registered document identification information in the file management area of the optical disk. Thus, the attribute information area 618 of the binder n registered as registration destination is retrieved, and the number of registered documents is counted up. A document identification number K in the binder n is obtained, and the registered document name and image information of comment are registered in the associated document name area 632. Thus, the document identification number K and registration date are registered in the document attribute information area 635.

Specifically, the binder attribute information 623 relating to the number-of-document-files 622 and the output/non-output of the retrieval sheet is actually updated, and the new document identification number 650 is issued. The address of the associated document name area 636 is registered in the document name address area 633 corresponding to the new document identification number 650. The displayed document name image information and the image information of the additional information developed on the video memory 71 is converted to a predetermined amount of two-value bit image information by a predetermined control system and registered in the corresponding document name area 636.

In addition, in the corresponding document management address area 634, the addresses of the corresponding document attribute information area 635 and document information area 601 are registered. The document attribute information items 654 relating to the document identification number 650, document registration date 651, number-of-documents 652, original document size 653 and presence/absence of additional recording on the retrieval sheet P are registered in the corresponding document attribute information area 635 under the control of the control unit 28.

The document information input by the scanner 21 is compressed and converted to two-value data and stored (registered) in the corresponding document information area 601. The top address thereof is successively registered, in units of pages, in the K-th document management address section 634 of the binder n. The page number 652 of the document attribute information area 635 is also updated in every page registration processing. The document image size can be varied in units of a page, and the information on each page is registered and managed in the page information area 637.

Figure 29A:
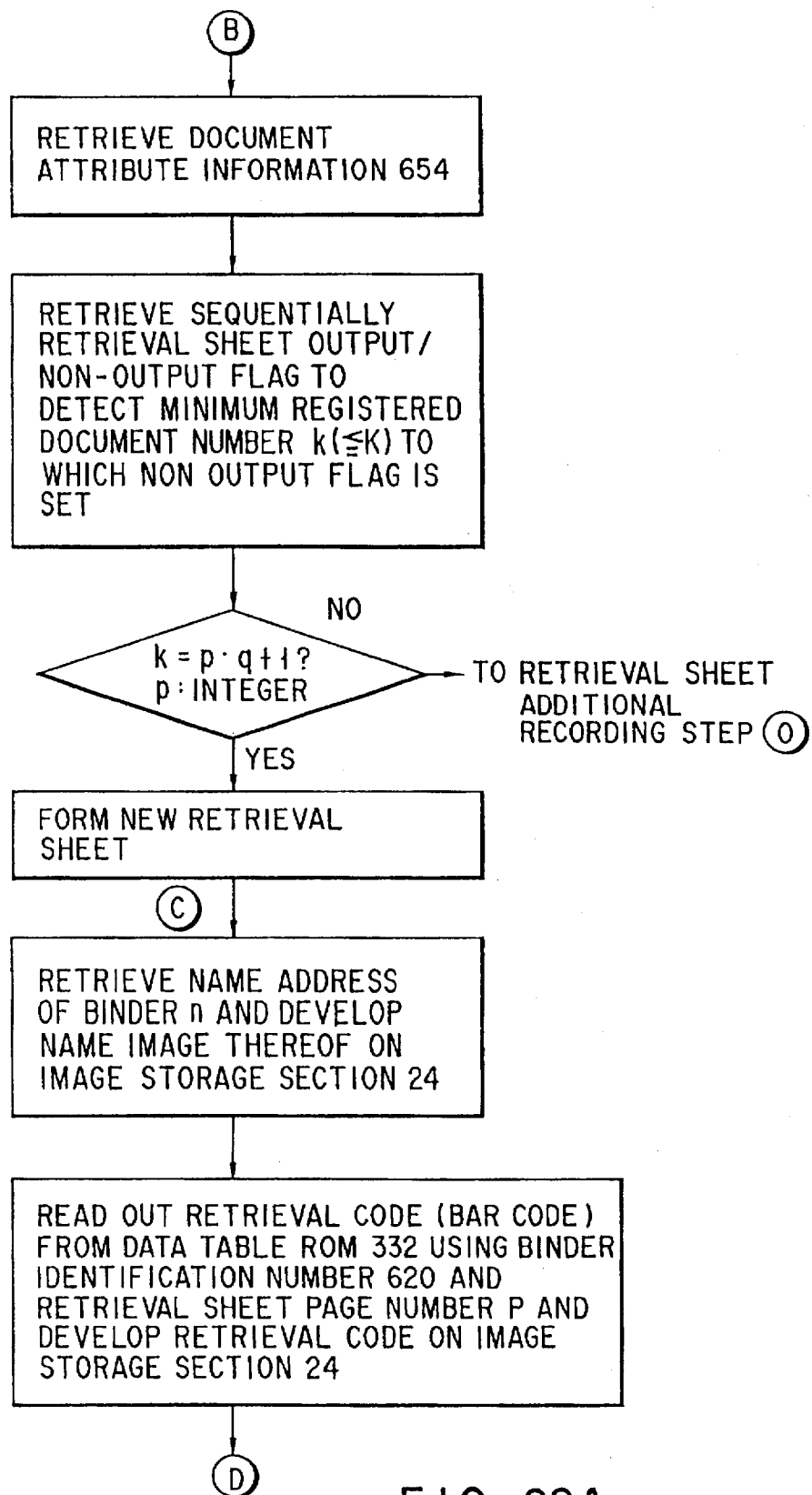
FIGS. 29A and 29B are flow charts showing the procedure for newly printing out a retrieval sheet at the time of document registration.
Figure 29B:
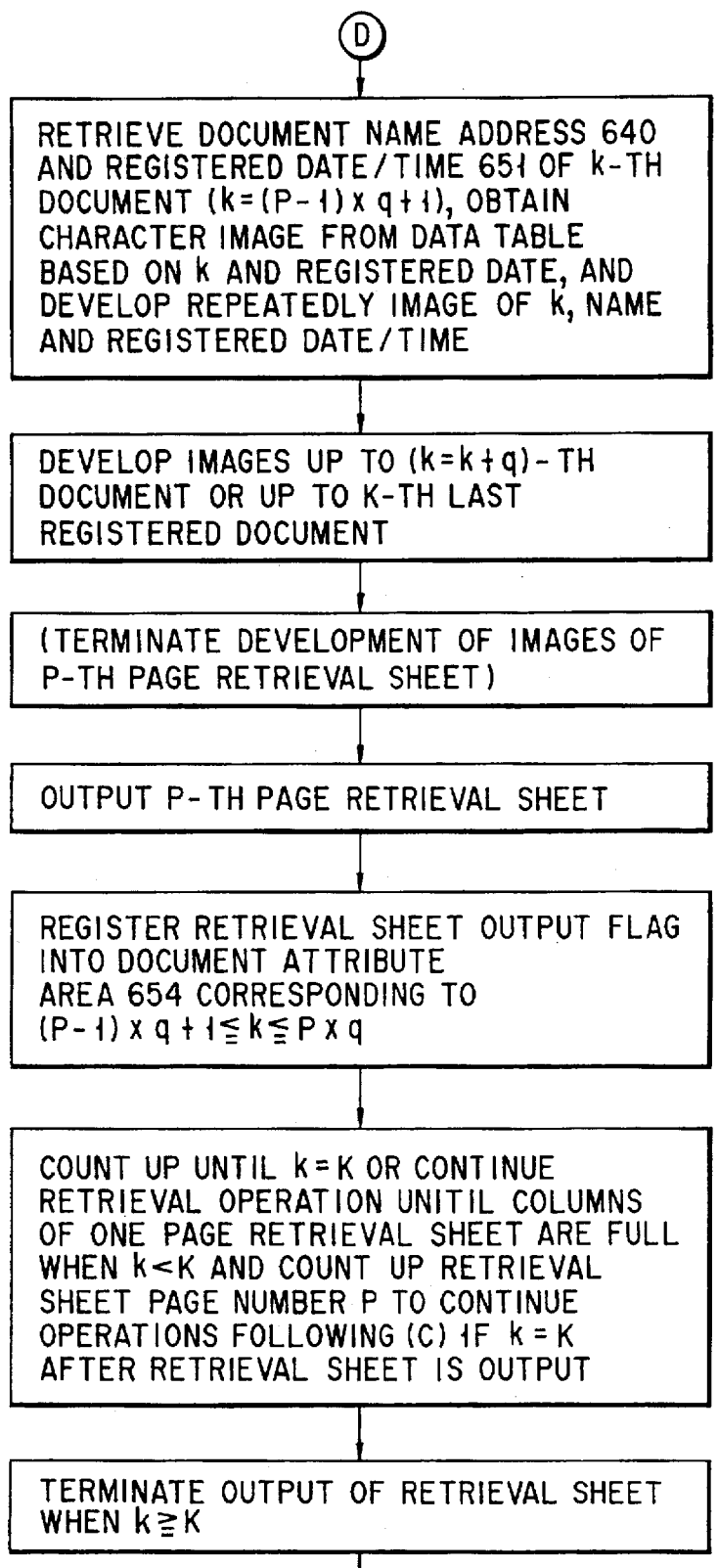
Figure 30A:
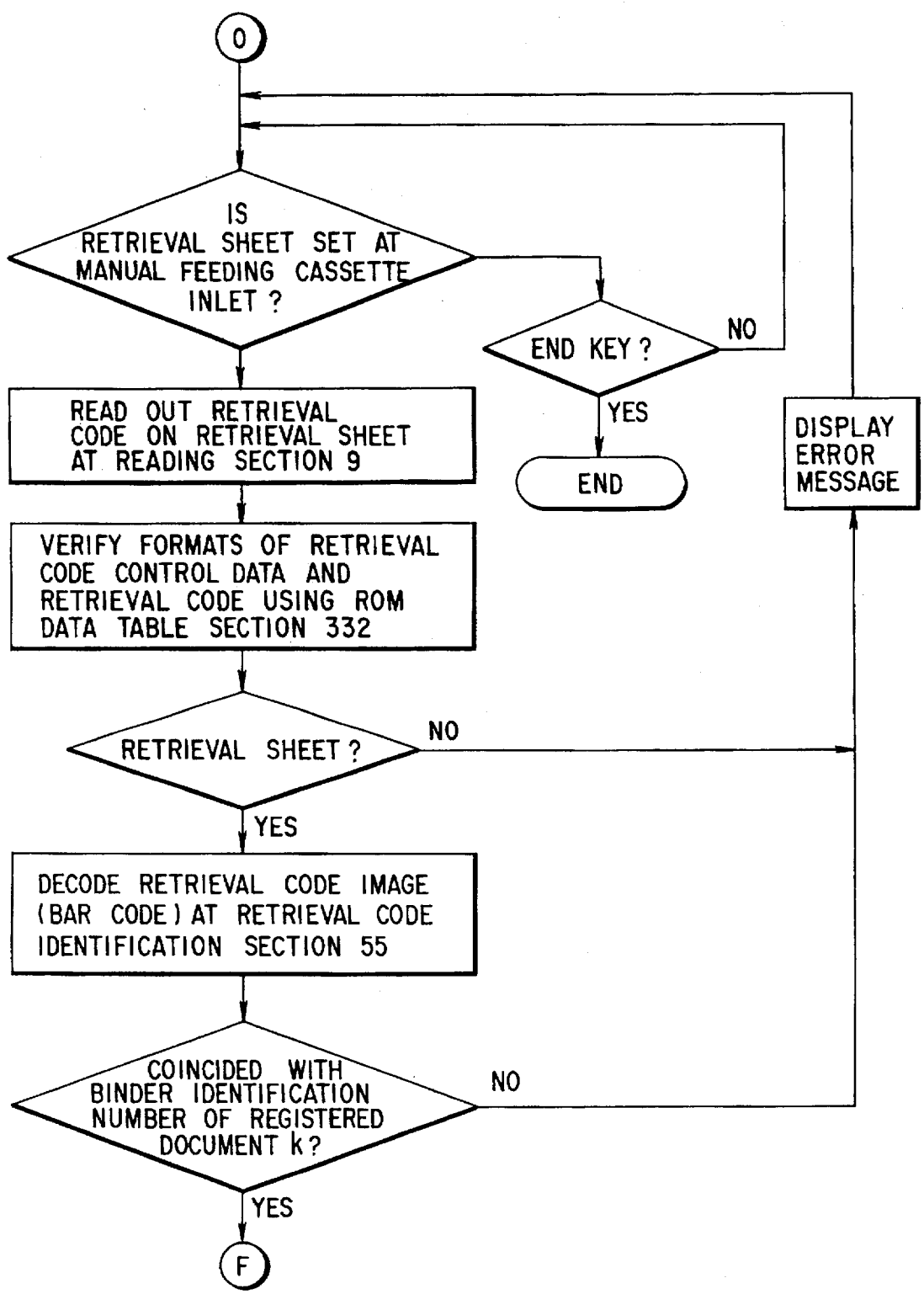
FIGS. 30A to 30C and 31A, 31B are flow charts showing the procedure for effecting an additional print on a document retrieval sheet after a K-th document of binder n is registered.
Figure 30B:
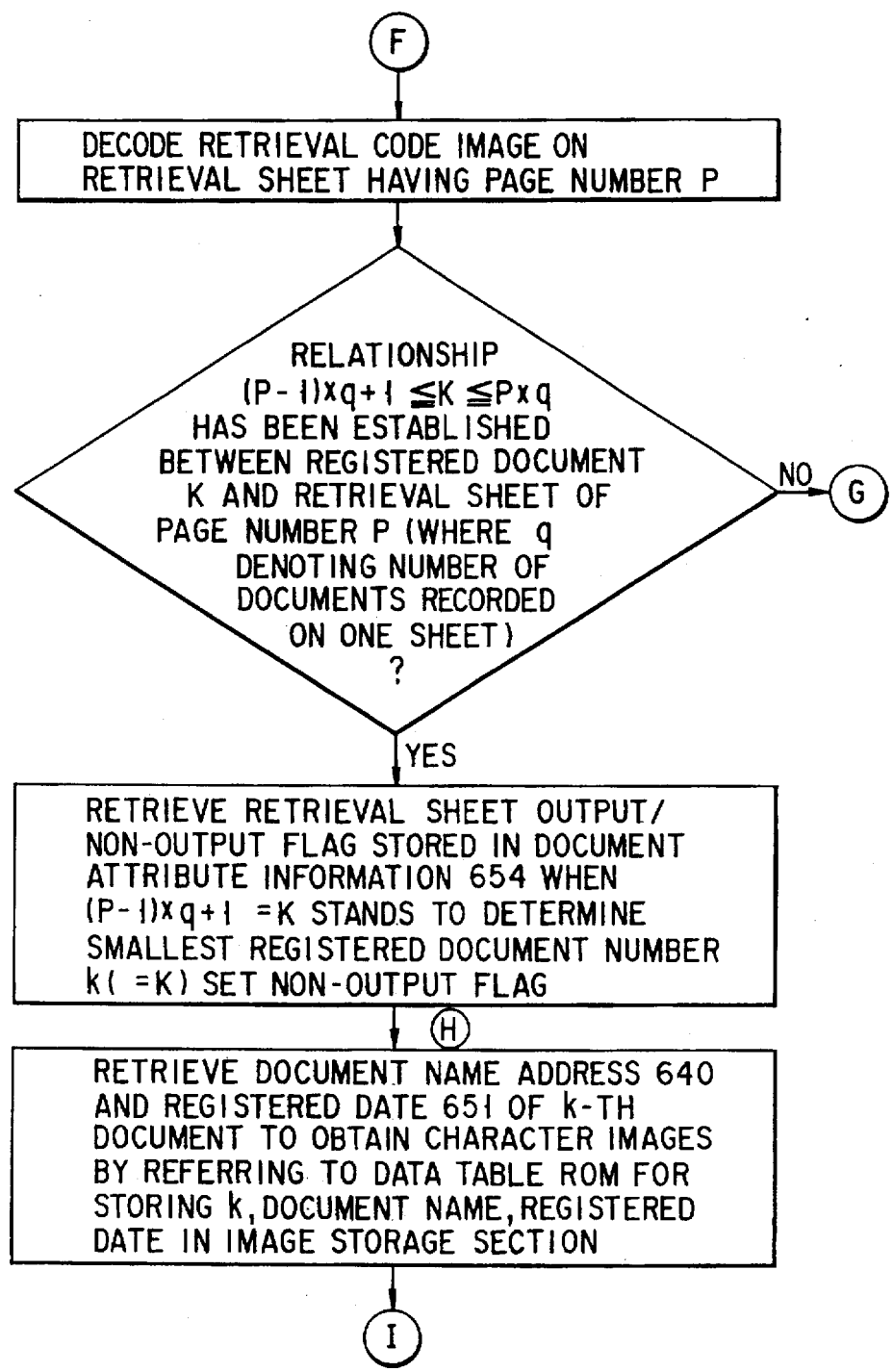
Figure 30C:
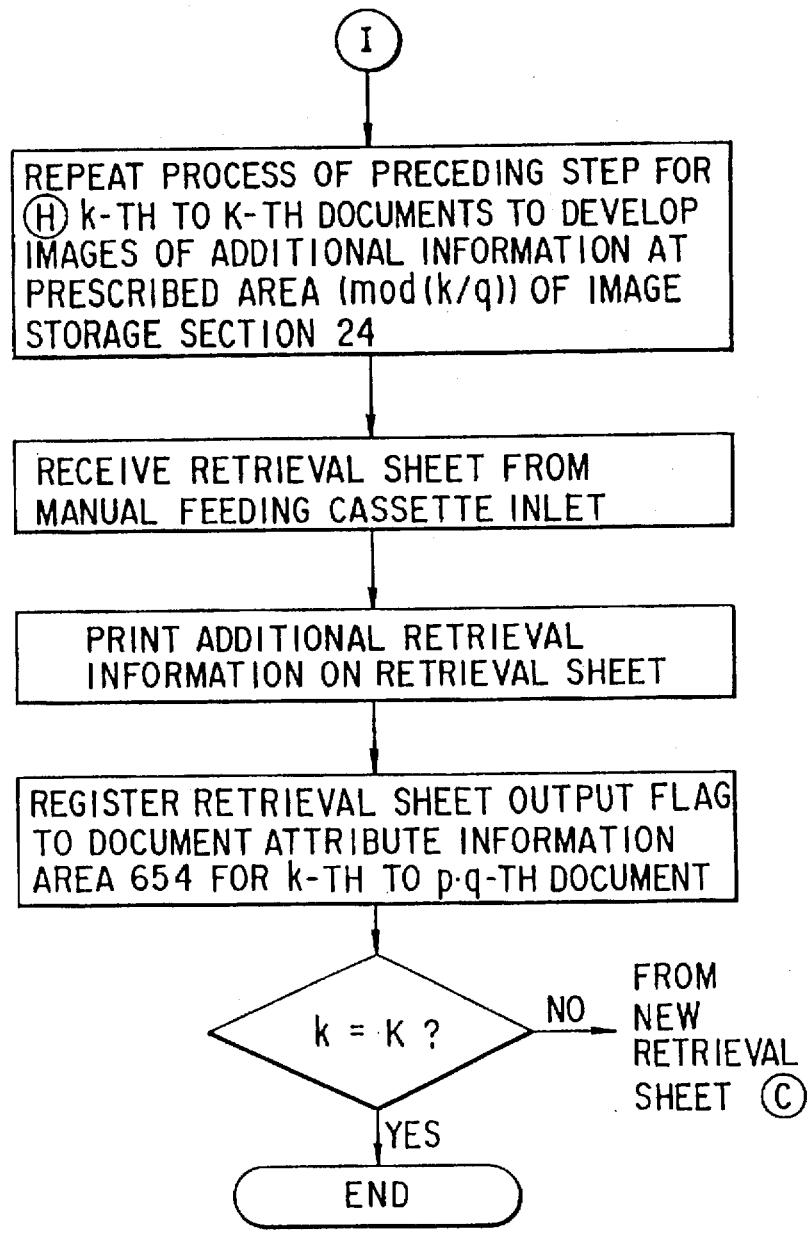
Figure 31A:
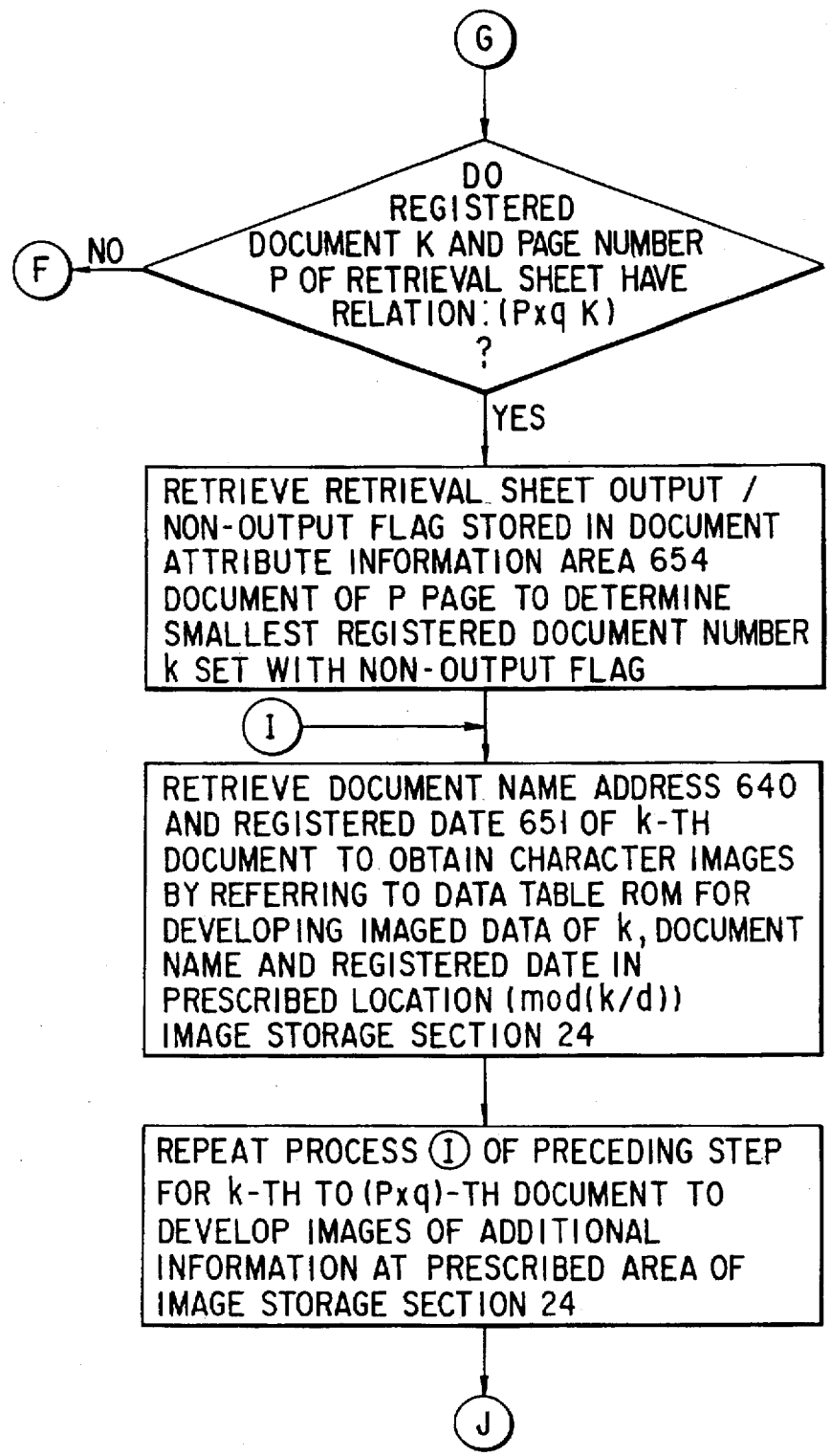
Figure 31B:
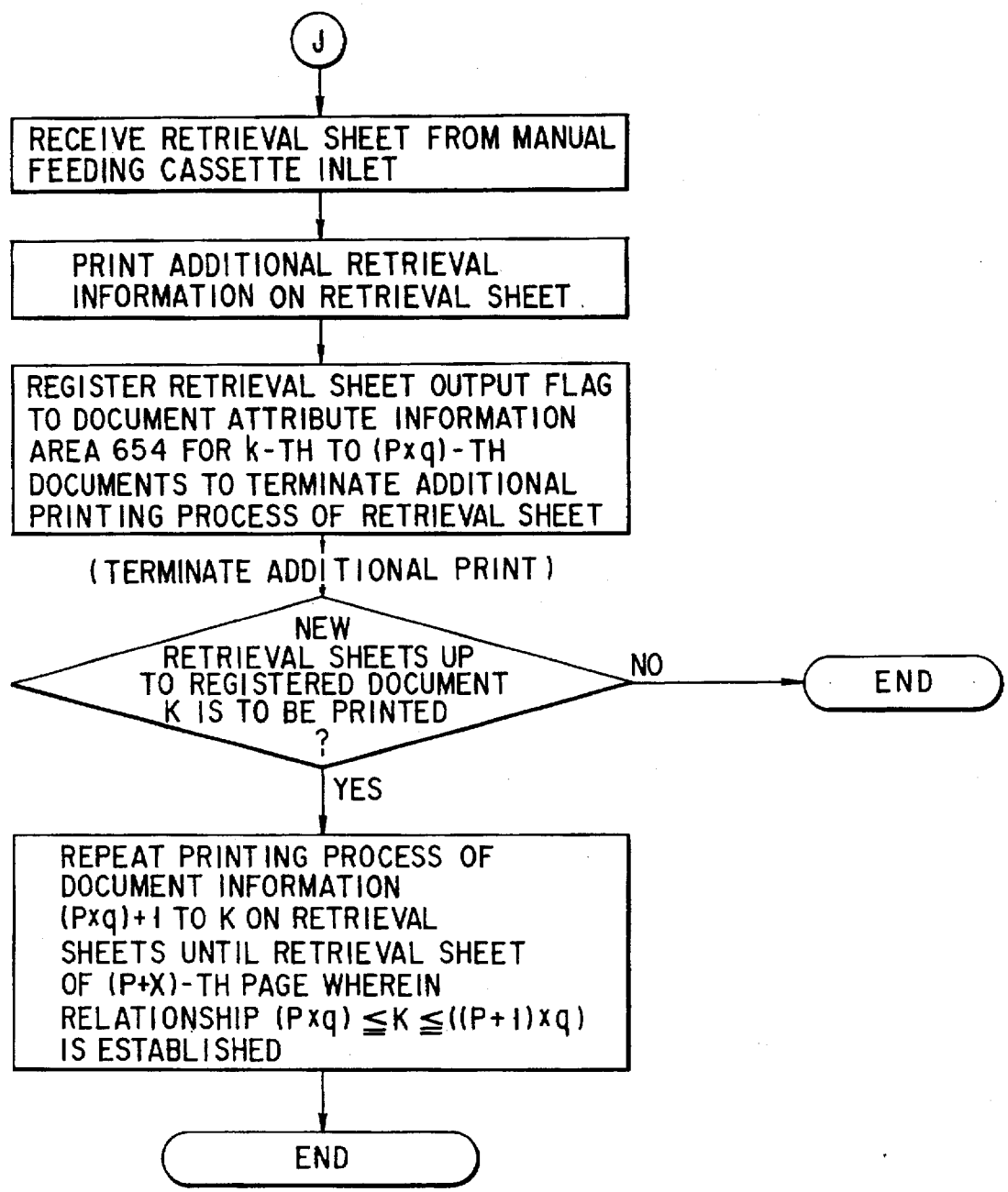

Specifically, the document information obtained by the scanner 21 is developed in the image storage unit 24 via the SPIF 23 and image bus 30. Thereafter, the information is compressed and subjected to two-value processing by the encoding/decoding unit 27. Then, the resultant two-value data is successively stored in the document information area 601 of the MO disk 41 set in the MO disk storage device 25 via the system bus 29 and MODIF 26. After the registration processing for document images of plural pages has been completed, a flag indicating non-output of retrieval sheet is set in the K-th document attribute information 654 of the binder n. At this stage, if the "non-output" of the retrieval sheet has been set by the control panel menu, the document registration processing is completed. However, if the "output" of the retrieval sheet is selected, processes for forming and outputting the new retrieval sheet, as shown in FIGS. 29A and 29B, are executed, following the registration process. This will be described later.

The state of the document registration processing is displayed at any time on the message display unit 163 on the display screen of FIG. 27. If the processing is normally completed, "DOCUMENT NAME RETRIEVAL MENU" of FIG. 23 is display once again, with the name of the newly registered document added to a document name display/selection section 123.

By selecting the previous page key 164, "DOCUMENT REGISTRATION MENU (1)" of FIG. 26 is displayed once again. If the stop key 165 is selected, the document registration processing is stopped, and "DOCUMENT NAME RETRIEVAL MENU" of FIG. 23 is restored.

Next, the document retrieval processing procedure without use of the retrieval sheet P will now be described. The procedure for forming the retrieval sheet P and the procedure for retrieving the document using the retrieval sheet P will be described later.

In the "DOCUMENT NAME RETRIEVAL MENU" of FIG. 23, the "SEARCH" operation mode is selected as an initial value in an operation mode selection unit 122. In the "SEARCH" mode, the in-binder document number 123-1 of the document name display/selection section 123 is selected by the pen 62, or the document number is input from the numerical key section 64 on the operation panel 2. Thereby, the screen of "DOCUMENT RETRIEVAL MENU" of FIG. 24 is displayed.

When the "CHANGE" mode is selected, the in-binder document number 123-1 of the document name display/selection section 123 or the document number is input from the numerical key section 64 on the operation panel 2. Thereby, a menu "CHANGE OF DESIGNATED DOCU- MENT NAME" (not shown) is displayed, and the document name is changed.

When the "DELETE" mode is selected, the in-binder document number 123-1 of the document name display/selection section 123 is selected by the pen 62, or the document number is input from the numerical key section 64 on the operation panel 2. Thereby, the document information of the designated document name can be deleted.

In the "DOCUMENT NAME RETRIEVAL MENU" of FIG. 23, the page number 125 coincides with the page number of the retrieval sheet P. By designating a page switch section 126 by the pen 62, page switch is effected. If a list of in-page registered document information items is not displayed in the document name display/selection section 123, an arrow display section 124 is designated, thereby scroll-displaying the contents of the document name display/selection section 123. The number of documents registered on one page is predetermined by a retrieval sheet format set by a system manager and is displayed according to current set format managed in the working RAM 333. By designating the document name retrieval mode end section 129, the "BINDER RETRIEVAL MENU" of FIG. 22 is restored. The selection of the retrieval sheet can be performed by touching a corresponding document name selection section or by inputting the document number from a ten-key device.

In the "DOCUMENT RETRIEVAL MENU" shown in FIG. 24, the document name selected within the "DOCUMENT NAME RETRIEVAL MENU" of FIG. 23 is displayed in a display menu title section 131, and the selected document information is confirmed. A document attribute display section 132 displays retrieved information items such as the number of pages and original document size which are stored in the document attribute information area 635 corresponding to the document management area 630 of the MO disk 41. Value "1" is displayed as an initial value of the number of copies. The value of the number of copies can be changed by the "+" key and "-" key displayed on both sides of the number of copies. In addition, this value can be set by the numerical key section 64 of the operation panel 2.

In an operation mode section 133, an "ALL-PAGE COPY" mode or a "DESIGNATED PAGE COPY" mode for document information is selected. In the "DESIGNATED PAGE COPY" mode, the designated page number is input by the numerical key section 64 in accordance with the message displayed on a message display section 134. Thus, the designated page number is displayed on a message display section 133-1 of the operation mode section 133.

When the start key on the operation panel 2 is depressed, the associated compressed two-value document information stored in the document information area 601 of the MO disk 41 within the MO disk storage device 25 is output to the system bus 29 via the MODIF 26 under the control of the control unit 28. Thereafter, the output information is decoded by the encoding/decoding unit 27 and developed in the image storage unit 24 via the image bus 30. This information is fed to the printer 22 via the SPIF 23 and is printed out.

The status of the document information output processing is displayed at any time on the message display section 134 on the display screen shown in FIG. 24. When the output processing is completed normally or the stop key 135 is selected, the "DOCUMENT NAME SEARCH" menu of FIG. 23 is restored. The retrieval output processing can be stopped by the stop key on the operation panel 2.

Referring to FIGS. 29A and 29B, the procedure for forming the retrieval sheet P (see FIG. 3A) will now be described. In this embodiment, the retrieval sheet P is produced and output for each binder. When the procedure for forming the retrieval sheet P is executed, there are three cases:

(1) The "RETRIEVAL SHEET RE-OUTPUT" is selected in the operation mode section 102 in the "BINDER RETRIEVAL MENU" of FIG. 22, and the binder name in the binder name display/selection section 103 is selected. Thereby, the retrieval sheets P for the selected binder are formed at a time;

(2) The retrieval sheet re-output menu 127 in the "DOCUMENT NAME RETRIEVAL MENU" of FIG. 23 is selected or "FORMING" of mode menu 162 in FIG. 27 is selected, and thereby the retrieval sheet P of the page corresponding to the displayed document name display/selection section 123 are formed; and (3) When "ADDITIONAL PRINTING" in the mode menu section 162 of the "DOCUMENT REGISTRATION MENU (2)" of FIG. 27 is selected and the registration processing is executed, additional information is recorded on the retrieval sheet P of the corresponding page.

The cases (1) and (2), are additional operations for re-outputting retrieval sheet P formed in case (3). Thus, the re-output processings are extraordinary procedures of forming the retrieval sheet.

The regular document registration procedure is the case (3).

The procedure for new preparation is performed in three cases:

i) There is no retrieval sheet when an entirely new binder is registered and an entirely new document is registered.

ii) A binder has been registered and a document has been registered, but the retrieval sheet has not been printed out and thus there is no retrieval sheet.

iii) Although there is a retrieval sheet, all columns have been filled and there is no space for additional record. The retrieval sheet is not set since it is useless to do so.

Since the document information items up to the K-th document information item are registered in the binder n, the number of document information items which can be recorded on a single retrieval sheet can freely be set. If the number of document information items is q, the forming and outputting processing of the retrieval sheet can be repeated in units of a page up to the page P which meets the relationship:

$$(P-1)33 \; q <= K <= P \times q.$$

The case of K=1 is the case of new registration in which a new retrieval sheet is formed.

If the "FORMING" in menu 162 is designated in FIG. 27, an associated portion of the page corresponding to the information section indicating whether or not the retrieval sheet has been output, which is defined within the associated binder attribute information 623 in units of a page of retrieval sheet P is changed to "already output." Further, the data of the information section indicating whether or not the document identification information has been recorded on the retrieval sheet, which is similarly defined by the document attribute information 654 of document information belonging to the corresponding binder, is changed to "already recorded." The binder name area and binder attribute area within the associated arrange are successively retrieved in units of a page of the corresponding in-page document name area and document attribute area. The numerical (code) data which becomes retrieval information is converted to bit-image information by using various conversion tables such as a retrieval code conversion table defined in the data table ROM 332 and a character generator. The converted data is combined with other pre-defined retrieval sheet record data and developed in the image storage unit 24 in units of a page of the retrieval sheet P. Thereafter, the data in the image storage unit 24 is transferred to the printer 22 via the SPIF 23 and is successively printed out by the printer 22.

The retrieval sheet is formed in units of a page by developing the image data in the image storage unit 24. The processing for developing image data into the image storage unit 24 is controlled to be started after the processing for clearing image data has been performed. In the case of the retrieval sheet as shown in FIG. 3, the binder name 11 of the binder n is first retrieved as a title. That is, the name address section 616 of the binder n is retrieved, and a bit-image is developed at a predetermined position of the image storage unit 24. Next, the bar code 13 which will serve as a retrieval code for the retrieval processing with use of the retrieval sheet is formed by combining the identification number n of the binder n and the page number P of the retrieval sheet. A bar code pattern corresponding to numerical values is registered in the data table ROM 332. Thus, it is possible to form a bar code of the retrieval code number (binder number n+retrieval sheet page number P), and the bar code image of the retrieval code is developed at a predetermined position of the image storage unit 24. In addition, the image of the page number P (denoted by "12" in FIG. 3A) of the retrieval sheet is developed below the bar code.

Next, the document information is successively developed. First, the document development is performed from the [(P−1)×q+1]-th document information item to the [(P×q)]-th document information item registered in the binder n (or until k=K is established). Thus, the following document information development processing is repeated until the document number k changes from (P−1)×q+1 to P×q. First, the document name address 640 and registration date 651 of the associated document information are retrieved. The obtained numerical information is converted to numerical images by referring to the character generator of the data table ROM 332, and the images are developed at predetermined positions of the image storage unit in the order of document number k, document name/comment information, and registration date. After the image of the one-page retrieval sheet has been completed, the output processing is performed by the image forming/storage unit.

Since the document information items from the [(P−1)×q+1]-th document information item to the [(P×q)]-th or K-th document information item have been recorded on the retrieval sheet, the flag indicating the completion of output of retrieval sheet is registered on the document attribute information 654.

The above formation/output processing is repeated until P-pages of retrieval sheets are output. As regards the retrieval sheet of the P-th page, the image development is finished at the time the image of document K (<=P×q) registered finally in the binder n has been developed, and the image forming/recording processing of the P-th retrieval sheet is executed.

In the case (3) of the above-mentioned retrieval sheet forming process, it is possible to record in the already produced retrieval sheet P additional document identification information which was additionally registered in the binder. The procedure for the additional recording will now be described with reference to FIGS. 30A to 30C, 31A and 31B. If the associated retrieval sheet P of the displayed binder has already been output when the binder attribute information 623 is retrieved (in FIG. 27 "ADDITIONAL RECORD" is automatically set as an initial value in the mode menu section 162), the retrieval code reader 9 is controlled. Thereby, image density information at a predetermined position on the retrieval sheet P set at the retrieval sheet receiving port 6 is read, and the retrieval code is obtained by the processing which has been described above with reference to FIG. 6. If the retrieval code does not correspond to the retrieval code of the binder displayed on the LCD section 61, a message such as "SET CORRECT RETRIEVAL SHEET" is displayed.

When the sheet to be recorded additionally is set at cassette inlet at the time the registration of the K-th document of the binder n is completed, the retrieval code area 13 on the retrieval sheet is read by the retrieval code reader 9. Then, the bar code is decoded and the numerical information of the retrieval code is obtained. If the numerical conversion processing of the bar code has not normally been performed because of a format error or the like, an error message or the like is displayed on the control panel to instruct resetting of the retrieval sheet. Then, it is judged if the numerically converted binder number coincides with the binder n. If not, it is determined that the retrieval sheet of a different binder has been set, and an error message is displayed to instruct resetting of the retrieval sheet.

In the case where document registration is performed without a retrieval sheet although the retrieval sheet has already been issued, it is necessary to select an additional registration destination binder within an optical disk set in a device according to "binder retrieval menu" in FIG. 22.

At the time of normal document registration to a binder, the retrieval sheet of which has already been issued, the retrieval sheet is set at the manual cassette port 7. As regards the menu, the "retrieval sheet input" on the mode menu 102 in FIG. 22 is selected without selecting any binder and thus the document new registration menu (1) shown in FIG. 26 is displayed. At this time, the binder name of a binder selected by a retrieval code read by the retrieval code read unit 9 is displayed on the binder name display area within the menu. Further, at this time, the relationship between the numerically converted page number P of the search sheet and the document number K is examined. If the relationship, (P-1)×q+1<=K<=P×q, is satisfied, it is possible to additionally write information of the K-th registered document on the P-th retrieval sheet. Thus, the output/non-output flag of the retrieval sheet of the document attribute information 654 of the document number"(P−1)×q+1<=K" is retrieved, and a minimum document number k on which the non-output flag is set is determined. The data in the image storage unit 24 is cleared, and only the image development processing of the k-th to K-th document information items is performed. Thereafter, the image forming/recording unit is controlled, and the P-page-th retrieval sheet is inserted from the manual feed cassette port. Thus, additional recording of document information is effected. After the additional recording processing, the flag indicating that the retrieval sheet has been output is registered in the document attribute information area 654 of the k-th to K-th document information items.

If the formula, (P-1)×q+1<=K<=P×q, is not satisfied in connection with the relationship between the page number P and document number K of the retrieval sheet set at the manual feed cassette port, it is judged that (P-1)×q+1<=k<=P×q<K. Then, the retrieval sheet output/non-output flag of the document attribute area 654 of the document number k recorded on the P-page-th retrieval sheet is retrieved, and the minimum document number k on which the non-output flag is set is determined.

The data in the image storage unit 24 is cleared, and only the image development processing of the k-th to Pxq-th document information items is performed. Thereafter, the image forming/recording unit is controlled, and the P-page-th retrieval sheet is inserted from the manual feed cassette port. Thus, additional recording of document information is effected.

After the additional recording processing, the flag indicating that the retrieval sheet has been output is registered in the document attribute information area 654 of the K-th to Pxq-th document information items.

At this stage, the processing for outputting to the retrieval sheet the registration document information of document No. Pxq+1 to document No. K has not been performed. Thus, it is determined whether the processing for producing the retrieval sheet up to the final registration document K in the binder n should be executed. If the retrieval sheet is produced continuously, the same processing as illustrated in FIGS. 30A to 30E is performed.

As has been described above, when the retrieval sheet P is output once again, the above-mentioned retrieval sheet forming processing is executed according to the displayed menu. In the case of additional recording, the retrieval sheet P is set once again, and the retrieval code reader 9 is controlled. Thereby, the retrieval code is obtained. If the retrieval code of the binder is obtained, the data in the information section representing whether or not the document identification information of the document attribute information 654 of the document information belong to the binder is retrieved. The document attribute information of "not recorded" is changed to "recorded" and the document name area and document attribute area are successively retrieved. In addition, the numerical value (code) data serving as retrieval information is converted to bit-image information by referring to various conversion tables such as a retrieval code conversion table and a character generator defined within the data table ROM 332. The converted data is combined with the pre-defined other retrieval sheet recording data and is developed at the corresponding pre-determined additional recording positions within the image storage unit 24 managed by the document identification number. Thereafter, the data in the image storage unit 24 is transferred to the printer 22 via the SPIF 23 and the additional record image is printed out by the printer 22 onto the retrieval sheet P inserted from the manual feed table 7 by means of a manual feed mechanism (not shown).

The procedures of the document retrieval processing and the document registration processing with use of the thus formed retrieval sheet P will now be described. In the initial menu of the file mode shown in FIG. 22, the "RETRIEVAL SHEET INPUT" operation mode is selected in the operation mode selection section 102. The retrieval sheet P on which the document identification information of the document to be retrieved or the latest retrieval sheet P of the binder of the document registration destination is set at the retrieval sheet receiving port 6. The start key on the operation panel 2 is depressed. Thereby, the search/registration processing with use of the retrieval sheet P is executed.

Specifically, the retrieval code on the retrieval sheet P is read by the retrieval code reader 9 in the same manner as the additional recording processing of the retrieval sheet P. The document name area 636 and document attribute information area 635 registered in the document management area 631 of the associated page in the binder corresponding to the retrieval code are retrieved. The associated document identification information such as document identification number 650 and document registration date 651 is developed in the video memory 71 along with other associated display menu items in the data table ROM 332, thereby displaying the screen of "DOCUMENT NAME RETRIEVAL MENU" of the associated page of the binder or the screen of "DOCUMENT NAME RETRIEVAL MENU" of the associated page of the binder of the registration destination which includes the document identification information of the object to be retrieved as shown in FIG. 23.

Figure 32A:
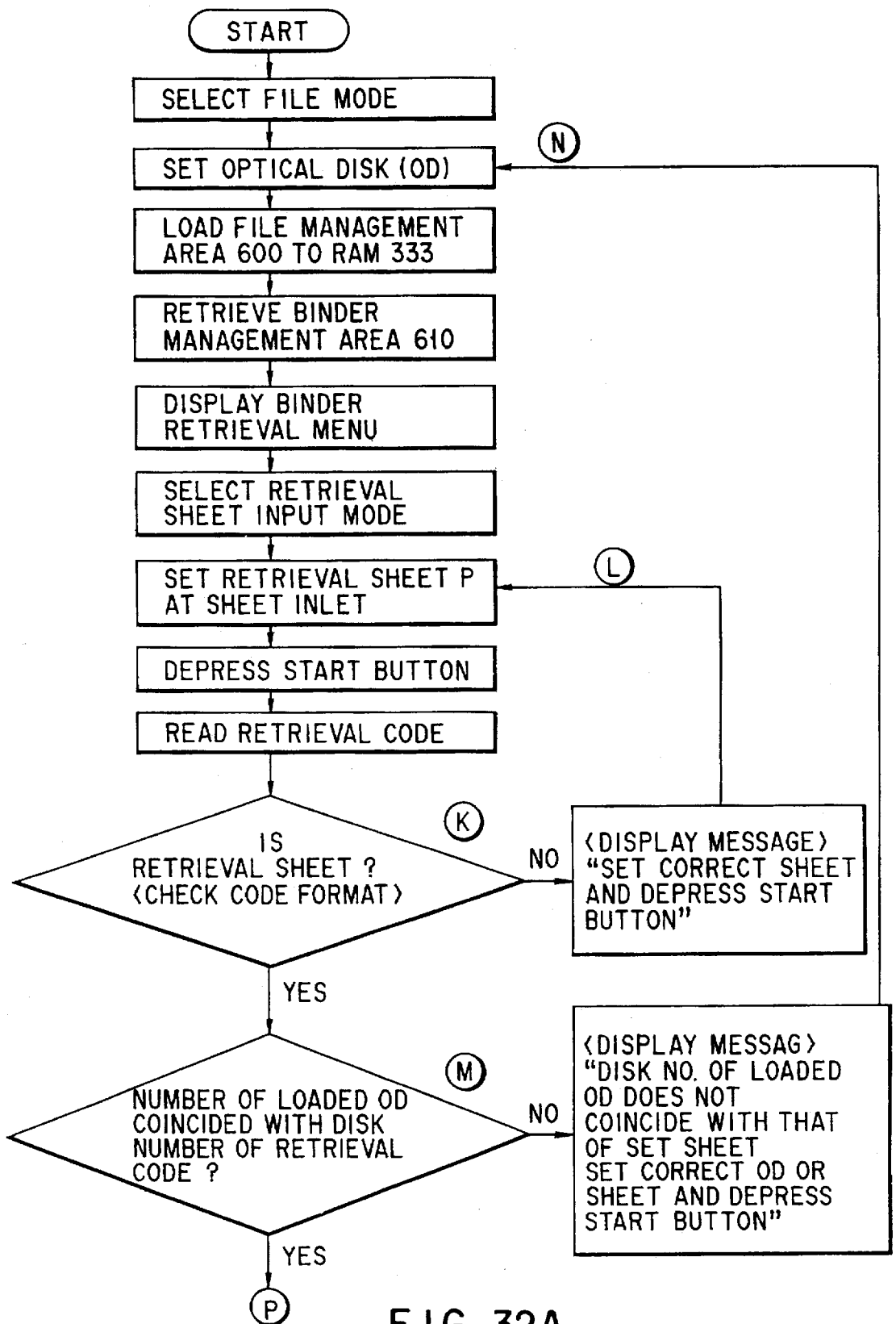
FIGS. 32A and 32B are flow charts showing the procedure for retrieving documents using retrieval sheet P.
Figure 32B:
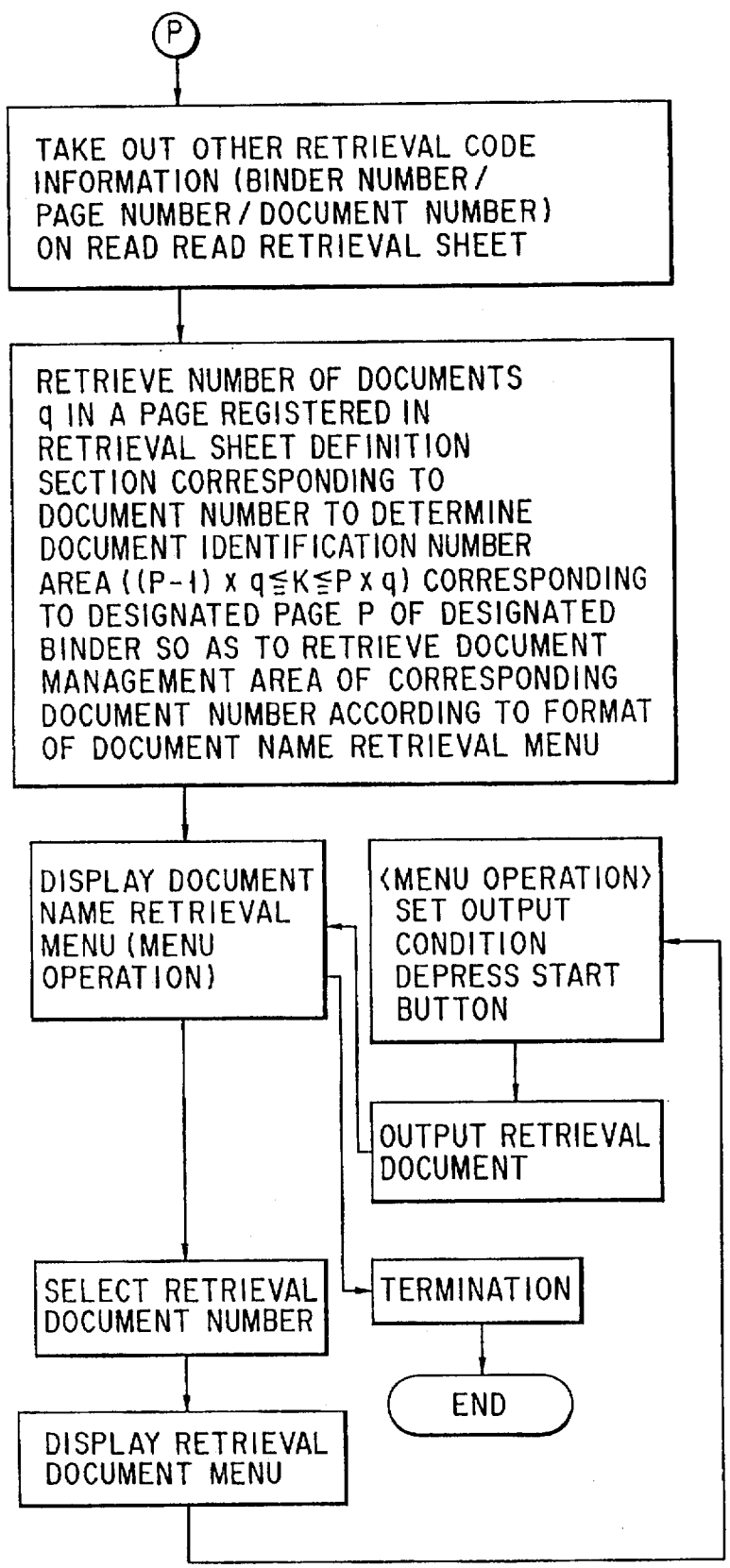

The document retrieval process procedure using the retrieval sheet P shown in FIGS. 32A and 32B will now be described.

At the time of document registration, the file mode is selected, and the control unit 28 confirms mounting of the optical disk (OD). Then, OD information of the in-OD file management region 600 is loaded in the work RAM 333. In the file mode operation, the RAM 333 is accessed and thereby various OD management information is obtained.

The binder retrieve menu (FIG. 22) is displayed as main menu, and "retrieve sheet input" 102 is selected. The retrieve sheet P, on which document identification information to be retrieved is recorded, is set in the retrieval sheet receiving or inlet port 7 (FIG. 1),and the start key 65a on the operation panel 2 is depressed. Thus, the CPU receives a retrieve code read start notice, reads predetermined retrieve code section 13 on the retrieve sheet, and identifies the format of the retrieve code section. When the format of the retrieve code coincides with the retrieve code format managed in the apparatus side in advance, the cabinet number, binder number, retrieve sheet format number and retrieve sheet page number are fetched in the control unit 26 as identification information which has image/code converted by the retrieve code read unit (see FIG. 6), and the fetched data is collated with the cabinet number of the mounted OD. When the formats of the retrieve sheets do not coincide, a message is displayed in the routine K in FIG. 32A. The direction of the set retrieval sheet, etc. are confirmed, and the control routine is repeated from the process (L) for setting again the right retrieval sheet. When the cabinet numbers do not coincide (M), a predetermined message is displayed, and in some cases the control routine is repeated from the process (N) for setting the OD once again.

After coincidence of the cabinet numbers is confirmed, the document management information region of the associated binder and the number of in-page output documents of the associated retrieve sheet format definition section (FIG. 11B) are retrieved from other identification information items read from the retrieve sheet (i.e. binder number, page number, format number of retrieve sheet). For example, in the case where the number of in-page output documents is q and the page number of the retrieve sheet is P, if the document identification number is k, the document information of the document identification numbers meeting the condition, $(P-1) \times q \leq k \leq P \times q$, is to be retrieved. After the document information region to be retrieved is determined, the document management region to be retrieved is retrieved according to the menu format on the operation panel defined by the table ROM 332, and display document identification information is successively fetched out. Thus, the document name retrieve menu as shown in FIG. 23 is displayed.

The subsequent retrieve process is the same as the retrieve process in the case of "non-use of retrieve sheet", and this process is carried out by menu operations. In the document name retrieve menu shown in FIG. 23, the user touches the associated retrieve document in the document name display/ selection section on the document name retrieve menu shown in FIG. 23 ("designation on the touch panel"). Alternatively, the document number of the displayed document is input by number keys on the control panel. Thus, the retrieve document is designated.

If the retrieve document is designated, the document retrieve menu shown in FIG. 24 is displayed. Thus, after output conditions such as the number of copies is designated, the retrieved document is printed out by activating the start button 65a. When the printing operation is completed, the control routine returns to the display of the menu shown in FIG. 23. Thus, the retrieval processing can be performed continuously. When the operation is finished, "end" mode 129 is selected.

Thus, in the "BINDER RETRIEVAL MENU" shown in FIG. 22, the processing can easily be changed to the subsequent document retrieval processing (FIG. 24) and document registration processing (FIG. 26) without performing the binder retrieval processing. The document retrieval processing and document registration processing shown in FIG. 24 and FIGS. 26 to 30 are the same as the processing without using the retrieval sheet P. Thus, the description thereof is omitted.

As has been described above in detail, according to the present invention, there is provided the means for printing out the document identification information items of document information items stored (registered) in the same binder, along with encoded retrieval information items, on the list-format retrieval sheet. In addition, there is provided the means for easily effecting additional recording of document identification information of additionally stored document information on the retrieval sheet of the associated binder. Thereby, the retrieval sheets can be managed easily and systematically. Furthermore, the storage space of retrieval sheets is reduced, as compared to the prior art, while the convenience of the retrieval processing with use of the retrieval sheet is maintained. Therefore, this invention can provide an image storing/forming apparatus with high operability in storage, management and retrieval processing of document information items.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image processing apparatus comprising:

means for reading document information;

means for storing the document information read by said reading means;

means for receiving a retrieval sheet used for retrieving the document information stored in said storing means, said retrieval sheet having a printing area for containing identification information to determine the document information stored in said storing means and at least one vacant printing area;

means for supplying new document information to said storing means in addition to the document information stored in said storing means;

means for forming new identification information representing said new document information being stored in said storing means;

means for printing the new identification information of the new document information stored in said storing means on the vacant printing area of said retrieval sheet received by said receiving means such that a plurality of identification information items of a plurality of document information items are printed additionally on vacant printing areas of the retrieval sheet; and means for outputting the retrieval sheet on which the identification information items are printed by said printing means.

2. An image processing apparatus according to claim 1, further comprising:

identification information storing means for storing identification information printed on printing areas of said retrieval sheet corresponding to the document information stored in said storing means so as to retrieve the document information from said storing means.

3. An image processing apparatus according to claim 1, which further comprises:

means for determining whether the retrieval sheet has the vacant printing area;

means for printing the identification information of the document information when said determining means determines that said retrieval sheet has the vacant printing area; and means for displaying message information indicating that said retrieval sheet has no vacant printing area when said determining means determines that said retrieval sheet has no vacant printing area.

4. An image processing apparatus comprising:

means for reading document information;

means for storing the document information read by said reading means;

means for receiving a retrieval sheet used for retrieving the document information stored in said storing means, said retrieval sheet having a printing area for containing identification information to determine the document information stored in said storing means and at least one vacant printing area;

means for supplying new document information to said storing means in addition to the document information stored in said storing means;

means for forming new identification information representing said new document information being stored in said storing means;

means for printing the new identification information of the new document information stored in said storing means on the vacant printing area of said retrieval sheet received by said receiving means such that a plurality of identification information items of a plurality of document information items are printed additionally on vacant printing areas of the retrieval sheet; and means for outputting the retrieval sheet on which the identification information items are printed by said printing means;

wherein said printing means includes
      means for detecting printed areas on which identification information is printed from a plurality of printing areas on said retrieval sheet; and
      means for specifying the vacant printing area for printing identification information based of a detection result obtained from said detecting means.

5. An image processing method comprising the steps of:

reading out document information;

storing the read document information into a storing medium;

supplying new document information to said storing medium in addition to the document information already stored in said storing medium;

forming new identification information representing said new document information being stored in said storing medium; and printing the new identification information for specifying the new document information stored in said storing medium to a vacant printing area of a plurality of printing areas formed on a retrieval sheet provided to determine the document information stored in said storing medium such that a plurality of identification information items of a plurality of document information items are printed additionally to vacant printing areas of the retrieval sheet.

6. An image processing method comprising the steps of:

reading out document information;

storing the read document information into a storing medium;

supplying new document information to said storing medium in addition to the document information already stored in said storing medium;

forming new identification information representing said new document information being stored in said storing medium; and printing the new identification information for specifying the new document information stored in said storing medium to a vacant printing area of a plurality of printing areas formed on a retrieval sheet provided to determine the document information stored in said storing medium such that a plurality of identification information items of a plurality of document information items are printed additionally to vacant printing areas of the retrieval sheet, wherein said printing step further comprises the steps of:

detecting printed areas of the plurality of printing areas on said retrieval sheet; and specifying a vacant printing area for additionally printing identification information based upon a detection result obtained by the detecting step.

* * * * *